(12) United States Patent
Huang et al.

(10) Patent No.: US 12,310,808 B1
(45) Date of Patent: May 27, 2025

(54) WATER FLOSSER

(71) Applicant: Thumbs Up Innovations Technology Co., Ltd., Guangdong (CN)

(72) Inventors: Jiacheng Huang, Guangdong (CN); Lilin Xu, Guangdong (CN); Xiu Zou, Guangdong (CN)

(73) Assignee: Thumbs Up Innovations Technology Co., Ltd., Zhuhai (CN)

( * ) Notice: Subject to any disclaimer, the term of this patent is extended or adjusted under 35 U.S.C. 154(b) by 0 days.

(21) Appl. No.: 18/800,012

(22) Filed: Aug. 10, 2024

(30) Foreign Application Priority Data

Aug. 5, 2024 (CN) .......................... 202421882350.0

(51) Int. Cl.
*A61C 17/02* (2006.01)
(52) U.S. Cl.
CPC ................................ *A61C 17/0202* (2013.01)
(58) Field of Classification Search
CPC .................................................. A61C 17/0202
See application file for complete search history.

(56) References Cited

U.S. PATENT DOCUMENTS

| | | | | |
|---|---|---|---|---|
| 1,482,747 A * | 2/1924 | Howe | ................ | A61C 17/0202 239/371 |
| 4,365,376 A * | 12/1982 | Oda | ...................... | A61C 17/22 601/165 |
| 6,164,967 A * | 12/2000 | Sale | ...................... | A61C 17/227 433/80 |
| 6,622,333 B1 * | 9/2003 | Rehkemper | ............ | A61C 17/30 15/28 |
| 6,739,782 B1 * | 5/2004 | Rehkemper | ........ | A46B 11/0041 401/152 |
| 11,759,300 B1 * | 9/2023 | Huang | ............... | A61C 17/0202 15/4 |
| 11,992,379 B1 * | 5/2024 | Schena | .................. | A61C 17/36 |
| 12,127,899 B2 * | 10/2024 | Mighall | ............... | A61C 17/222 |
| 2004/0045107 A1 * | 3/2004 | Egeresi | .............. | A61C 17/3436 601/165 |
| 2009/0197220 A1 * | 8/2009 | Cindrich | ............ | A46B 15/0053 15/167.1 |
| 2009/0298010 A1 * | 12/2009 | Broyles | ................ | B65D 47/305 433/90 |
| 2015/0164612 A1 * | 6/2015 | Kloster | ................ | A61C 17/028 433/90 |
| 2015/0188023 A1 * | 7/2015 | Pond | .................... | A61C 1/0015 310/317 |
| 2015/0282908 A1 * | 10/2015 | Wada | ................. | A61C 17/0202 433/89 |

(Continued)

*Primary Examiner* — Nicholas D Lucchesi

(57) ABSTRACT

A water flosser includes a shell, a pumping assembly and an oral rinse capsule. A water storage chamber and a liquid outlet communicated to the water storage chamber are provided inside the shell, and the liquid outlet is located at a bottom of the water storage chamber. The pumping assembly is arranged in the shell. A pumping port of the pumping assembly extends to a position, close to the liquid outlet, at the bottom of the water storage chamber. The pumping assembly is configured to pump liquid and spray the liquid out along a nozzle. An oral rinse accommodating chamber is provided in the oral rinse capsule. The oral rinse capsule is arranged at a bottom of the shell. The oral rinse accommodating chamber is communicated to the liquid outlet.

20 Claims, 13 Drawing Sheets

(56) References Cited

U.S. PATENT DOCUMENTS

| | | | |
|---|---|---|---|
| 2016/0250011 A1* | 9/2016 | Sergi | A61C 3/025 |
| | | | 433/88 |
| 2017/0007384 A1* | 1/2017 | Wagner | A61C 17/0205 |
| 2018/0132990 A1* | 5/2018 | Baeten | A61C 1/02 |
| 2020/0054426 A1* | 2/2020 | Prendergast | A46B 11/06 |
| 2020/0214794 A1* | 7/2020 | Hu | A61C 17/0205 |
| 2020/0222160 A1* | 7/2020 | Zhou | A61B 1/247 |
| 2022/0015882 A1* | 1/2022 | Kim | A61C 17/0202 |
| 2022/0151753 A1* | 5/2022 | Zhou | A61C 17/0205 |
| 2023/0011933 A1* | 1/2023 | Kenzler | A61C 17/222 |
| 2024/0074840 A1* | 3/2024 | Zhang | A45D 27/22 |

* cited by examiner

WATER FLOSSER

CROSS-REFERENCE TO RELATED APPLICATIONS

The application claims priority of Chinese patent application CN2024218823500, filed on Aug. 5, 2024, which is incorporated herein by reference in its entireties.

TECHNICAL FIELD

The present disclosure relates to the technical field of oral cleaning, and in particular, to a water flosser.

BACKGROUND

As an oral cleaning tool, a water flosser mainly cleans teeth and slits between the teeth with a water flow. Particularly, the water flosser can effectively clean the slits between the teeth. Therefore, the water flosser is particularly popular. To achieve a better cleaning result and ensure oral safety, the existing water flosser is generally used in conjunction with oral rinse. Products that use capsules to replenish oral rinse are convenient to use and can provide more continuous and convenient replenishment of the oral rinse.

An oral rinse capsule of an existing water flosser product is usually arranged at an upper part of the product. During use, a user needs to push the oral rinse capsule to inject oral rinse into a water storage chamber of the water flosser. Since a force direction of the oral rinse capsule is basically the same as a vertical axis direction of the product, the user needs to hold the product harder when pushing the oral rinse capsule, to overcome the pressure. Moreover, the oral rinse capsule is arranged at the top of the product and needs to be operated with two hands, it is inconvenient for the user. When the oral rinse is injected into the water storage chamber, the oral rinse is located at an upper part of a liquid surface, but a pump-out slot of the product is usually located at a bottom of the liquid surface in the water storage chamber. Therefore, it is not possible to immediately pump out liquid with a high concentration of oral rinse during use, so that the oral cleaning effect is poor.

Therefore, the present disclosure provides a water flosser that can effectively solve the above-mentioned problems. The water flosser has a simple structure and a good cleaning effect, and is convenient to use.

SUMMARY

In order to overcome the shortcomings of the prior art, the present disclosure provides a water flosser. The water flosser has a simple structure and a good cleaning effect, and is convenient to use.

The technical solution adopted by the present disclosure to solve the technical problem is as follows.

A water flosser, includes:
a shell, wherein a water storage chamber and a liquid outlet communicated to the water storage chamber are provided inside the shell, and the liquid outlet is located at a bottom of the water storage chamber;
a pumping assembly, wherein the pumping assembly is arranged in the shell; a pumping port of the pumping assembly extends to a position, close to the liquid outlet, at the bottom of the water storage chamber; the pumping assembly is configured to pump liquid and spray the liquid out along a nozzle; and an oral rinse capsule, wherein an oral rinse accommodating chamber is provided in the oral rinse capsule; the oral rinse capsule is arranged at a bottom of the shell; the oral rinse accommodating chamber is communicated to the liquid outlet; and the oral rinse capsule is configured to drive, under the action of an external force, oral rinse in the oral rinse accommodating chamber to enter the water storage chamber through the liquid outlet.

As an improvement of the present disclosure, an axis where a force direction of the oral rinse capsule is located is intersected with an axis or a projection of the shell in a vertical direction; the oral rinse capsule includes a capsule shell assembly, a piston assembly, and a connecting shell; the oral rinse accommodating chamber is arranged in the capsule shell assembly; the capsule shell assembly is further provided with a piston chamber; the piston chamber is communicated to the oral rinse accommodating chamber and is configured to be communicated to the liquid outlet of the water flosser; the piston assembly is slidably arranged in the piston chamber; the connecting shell is provided with a sliding chamber; the capsule shell assembly is slidably arranged in the sliding chamber; and when the capsule shell assembly slides inwards along the sliding chamber under the action of an external force, the piston assembly slides into the piston chamber to spray out the oral rinse in the piston chamber along the liquid outlet of the water flosser.

As an improvement of the present disclosure, the water flosser further includes a moving member, the moving member is movably arranged in the capsule shell assembly; the oral rinse accommodating chamber is formed between an inner wall of the moving member and an inner wall of the capsule shell assembly; and the moving member moves towards the piston assembly under the action of an atmospheric pressure and a hydraulic pressure difference in the oral rinse accommodating chamber.

As an improvement of the present disclosure, the water flosser further includes a first elastic member, a first end of the first elastic member abuts against the capsule shell assembly, and a second end of the first elastic member abuts against an inner wall of the sliding chamber.

As an improvement of the present disclosure, the connecting shell is provided with a connecting channel; a first end of the connecting channel is communicated to the piston chamber; and a second end of the connecting channel is communicated to the liquid outlet.

As an improvement of the present disclosure, the piston assembly includes a fixed rod and a piston rod; the fixed rod abuts against the shell and is inserted into the piston chamber; and the piston rod is slidably inserted into the piston chamber.

As an improvement of the present disclosure, the fixed rod is provided with a fixed rod channel; the piston rod is provided with a piston rod channel; and the piston rod is communicated to the piston chamber, the piston rod channel, the connecting channel, and the liquid outlet in sequence.

As an improvement of the present disclosure, the oral rinse capsule further includes a first check valve; the capsule shell assembly is provided with a first communication hole; the first communication hole allows the oral rinse accommodating chamber to be communicated to the piston chamber; the first check valve is arranged in the first communication hole; and the first check valve is configured to allow the oral rinse to flow unidirectionally from the oral rinse accommodating chamber into the piston chamber.

As an improvement of the present disclosure, the oral cleaning liquid capsule further includes a sealing member;

the piston rod is further provided with a second through hole; the second through hole allows the piston chamber to be communicated to the piston rod channel; and the sealing member slidably sleeves the piston rod and closes or opens the second through hole.

As an improvement of the present disclosure, the capsule shell assembly is further provided with an air guide hole; an air pressure chamber is formed between the inner wall of the moving member and the inner wall of the capsule shell assembly; and the air guide hole is configured to communicate the air pressure chamber with an external atmosphere.

As an improvement of the present disclosure, a capsule accommodating chamber is provided at the bottom of the shell; and the oral rinse capsule is detachably inserted into the capsule accommodating chamber.

As an improvement of the present disclosure, a clamping slot is provided on a surface of the oral rinse capsule; a clamping assembly is arranged in the shell; a clamping end of the clamping assembly is threaded out of an inner wall of the capsule accommodating chamber of the shell and is detachably clamped in the clamping slot.

As an improvement of the present disclosure, the clamping assembly includes a clamping member, a push member, and a second elastic member; the shell is provided with a button hole; the push member is arranged in the button hole; a first end of the second elastic member abuts against the push member; a second end of the second elastic member abuts against the clamping member; the elasticity of the second elastic member drives the clamping member to be inserted into the clamping slot; and when pushed by an external force, the push member is configured to drive the clamping member to be removed from the clamping slot.

As an improvement of the present disclosure, the clamping assembly further includes a transmission member; a first end of the transmission member is rotatably connected to the push member; a middle part of the transmission member is rotatably connected to the shell; and a second end of the transmission member is rotatably connected to the clamping member.

As an improvement of the present disclosure, two clamping assemblies are included; and the two clamping assemblies are arranged in the shell and are respectively arranged on two sides of the capsule accommodating chamber.

As an improvement of the present disclosure, the water flosser further includes a removal assembly, the removal assembly includes a third elastic member and a removal convex block; an open pore is provided at an upper part of the inner wall of the capsule accommodating chamber; a first end of the third elastic member abuts against the shell; a second end of the third elastic member abuts against the removal convex block; an abutting end of the removal convex block is threaded out of the open pore and abuts against an upper surface of the oral rinse capsule.

As an improvement of the present disclosure, the third elastic member includes two springs; two spring accommodating slots are provided on the shell; the two springs are respectively inserted into the two spring accommodating slots; second ends of the two springs respectively abut against two ends of the removal convex block and are symmetrically arranged along an axis where the capsule accommodating chamber is located.

As an improvement of the present disclosure, the shell includes an upper shell and a bottom shell; the bottom shell is detachably connected to the upper shell; the water storage chamber is formed between the upper shell and the bottom shell; and the capsule accommodating chamber is arranged on the bottom shell.

As an improvement of the present disclosure, the water flosser further includes a first sealing ring, a first sealing groove is provided at an upper edge of the bottom shell; the first sealing ring is inserted into the first sealing groove; and an outer surface of the first sealing ring abuts against an inner wall of the upper shell.

As an improvement of the present disclosure, the water flosser further includes a lock catch assembly, the lock catch assembly includes a lock catch member and a fourth elastic member; a first end of the fourth elastic member abuts against the bottom shell; a second end of the fourth elastic member abuts against the lock catch member; and the lock catch member is locked on the upper shell.

As an improvement of the present disclosure, a lock catch slot is provided on the upper shell; and a lock catch portion of the lock catch member is detachably clamped into the lock catch slot.

As an improvement of the present disclosure, an open slot is provided on the bottom shell; a removal portion of the lock catch member is threaded out along the open slot; and the removal portion of the lock catch member is configured to be pushed by a user, so that the lock catch portion of the lock catch member is removed from the lock catch slot.

As an improvement of the present disclosure, the water flosser further includes a second check valve; the shell downwards extends along an edge of the liquid outlet to form a first abutment block; a protruding second abutment block is arranged in the shell; the second abutment block is arranged towards the first abutment block; the second check valve is provided with an abutment board; the first abutment block abuts against an upper surface of the abutment board, and the second abutment block abuts against a lower surface of the abutment board, to limit the second check valve between the first abutment block and the second abutment block; and the second check valve is configured to allow the oral rinse to unidirectionally flow into the water storage chamber along the liquid outlet.

As an improvement of the present disclosure, the second abutment block is provided with an insertion slot; the second check valve is provided with an insertion block; the insertion block downwards extends along the lower surface of the abutment board; and the insertion block is inserted into the insertion slot.

As an improvement of the present disclosure, the insertion block is provided with a limiting board; and an end surface of an inner side wall of the insertion slot abuts against the limiting board.

As an improvement of the present disclosure, a position, close to the liquid outlet, on an upper surface of the bottom shell protrudes upwards to form a protrusion, and the liquid outlet is arranged at a top of the protrusion.

As an improvement of the present disclosure, the upper surface of the bottom shell is inclined; a pumping space is formed between the protrusion and the lowest side of the upper surface of the bottom shell. The pumping port of the pumping assembly extends to the pumping space.

As an improvement of the present disclosure, a transparent observation window is provided at a bottom of a side wall of the upper shell. The observation window is configured to allow a user to observe a liquid level position inside the water storage chamber.

As an improvement of the present disclosure, the observation window includes a front observation window unit and a rear observation window unit. The front observation window unit and the rear observation window unit are respectively arranged on a front side and a rear side of the upper shell.

As an improvement of the present disclosure, the water flosser further includes a liquid injection cover; the upper shell is provided with a liquid injection port; the liquid injection port is communicated to the water storage chamber. The liquid injection cover is detachably covered at the liquid injection port.

As an improvement of the present disclosure, a rotating shaft hole is arranged at a position of the upper shell close to the liquid injection port. A rotating shaft is arranged at a connecting end of the liquid injection cover. The rotating shaft is rotatably inserted into the rotating shaft hole, so that the liquid injection cover can be detachably covered at the liquid injection port.

As an improvement of the present disclosure, the water flosser further includes a second sealing ring. A protruding sealing block is arranged on one side of the liquid injection cover facing the upper shell. The sealing block is provided with a second sealing groove. The second sealing ring is inserted into the second sealing groove. An outer surface of the second sealing ring abuts against an edge of the liquid injection port.

As an improvement of the present disclosure, a position of the upper shell close to the liquid injection port is inwards recessed to form an accommodating slot. When the liquid injection cover is covered at the liquid injection port, the liquid injection cover is basically accommodated in the accommodating slot.

As an improvement of the present disclosure, a free end of the liquid injection cover is bent outwards to form a pull portion. When the liquid injection cover is covered at the liquid injection port, a gap exists between the pull portion and the accommodating slot.

As an improvement of the present disclosure, a first buckle is arranged at a position of the liquid injection cover close to the sealing block, and a second buckle is arranged at the edge of the liquid injection port. The first buckle is clamped to the second buckle.

As an improvement of the present disclosure, the water flosser further includes a control panel. The control panel is arranged in the upper shell. The pumping assembly is electrically connected to the control panel. The upper shell is provided with a charging port. A charging terminal in the charging port is electrically connected to the control panel.

As an improvement of the present disclosure, the water flosser further includes a charging cover. The charging cover is detachably covered at the charging port.

As an improvement of the present disclosure, an insertion slot is provided at an edge of the upper shell close to the charging port, and the insertion slot is configured to allow a user to put a finger in.

As an improvement of the present disclosure, a friction holding portion is arranged on a surface of the upper shell. The friction holding portion is provided with friction lines.

As an improvement of the present disclosure, the upper shell has a narrow top and a wide bottom, and the friction holding portion is arranged at an upper part of the upper shell.

As an improvement of the present disclosure, the bottom shell is provided with a water leaking slot. The water leaking slot is communicated to an internal space of the bottom shell.

Beneficial effects: By the arrangement of the above structure, during use, a user holds the shell and can push the oral rinse capsule at the bottom of the shell at the same time to apply a force to the oral rinse capsule, and oral rinse in the oral rinse capsule is injected into the bottom of the water storage chamber, so that the pumping assembly works. The pumping port of the pumping assembly extends to the bottom of the water storage chamber and can pump liquid with higher concentration of oral rinse at the bottom of the water storage chamber, and the cleaning effect of the product is better. To maintain the center of gravity stable, the water flosser product usually has a narrow top and a wide bottom. The oral rinse capsule is arranged at the bottom of the shell. So that an oral rinse capsule with a larger size can be allowed to be used, thereby prolonging the service time of the product, reducing the frequency of replacing the oral rinse capsule, and facilitating use. Moreover, since the axis where the force direction of the oral rinse capsule is intersected with the axis or the projection of the shell in the vertical direction, there is no need to provide a higher holding force when a user pushes the oral rinse capsule. The user can push the oral rinse capsule more effortlessly and conveniently. The user holds the product with a single hand and pushes the oral rinse capsule with the palm.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
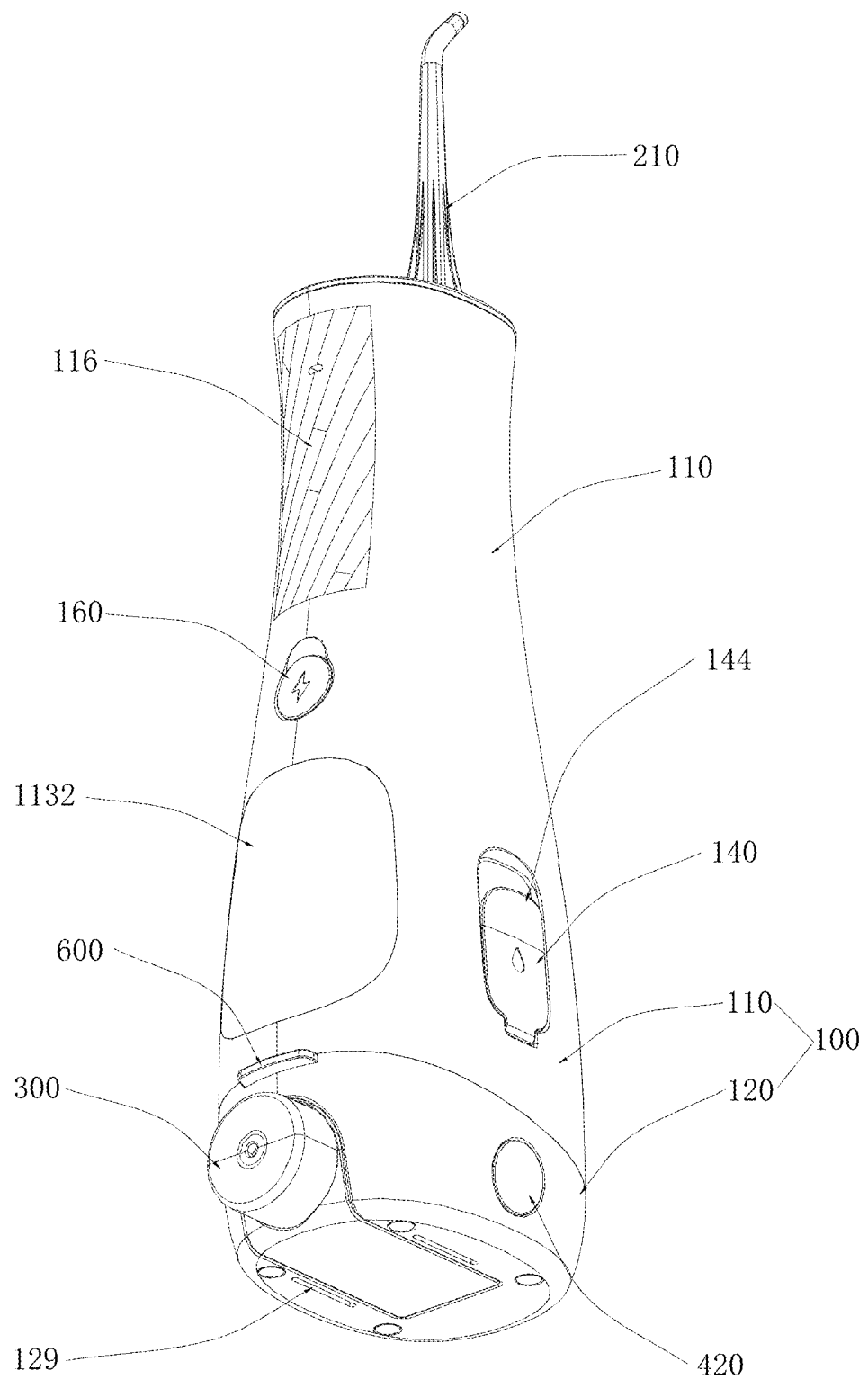
FIG. 1 is a schematic diagram of an entire structure of the present disclosure.
Figure 2:
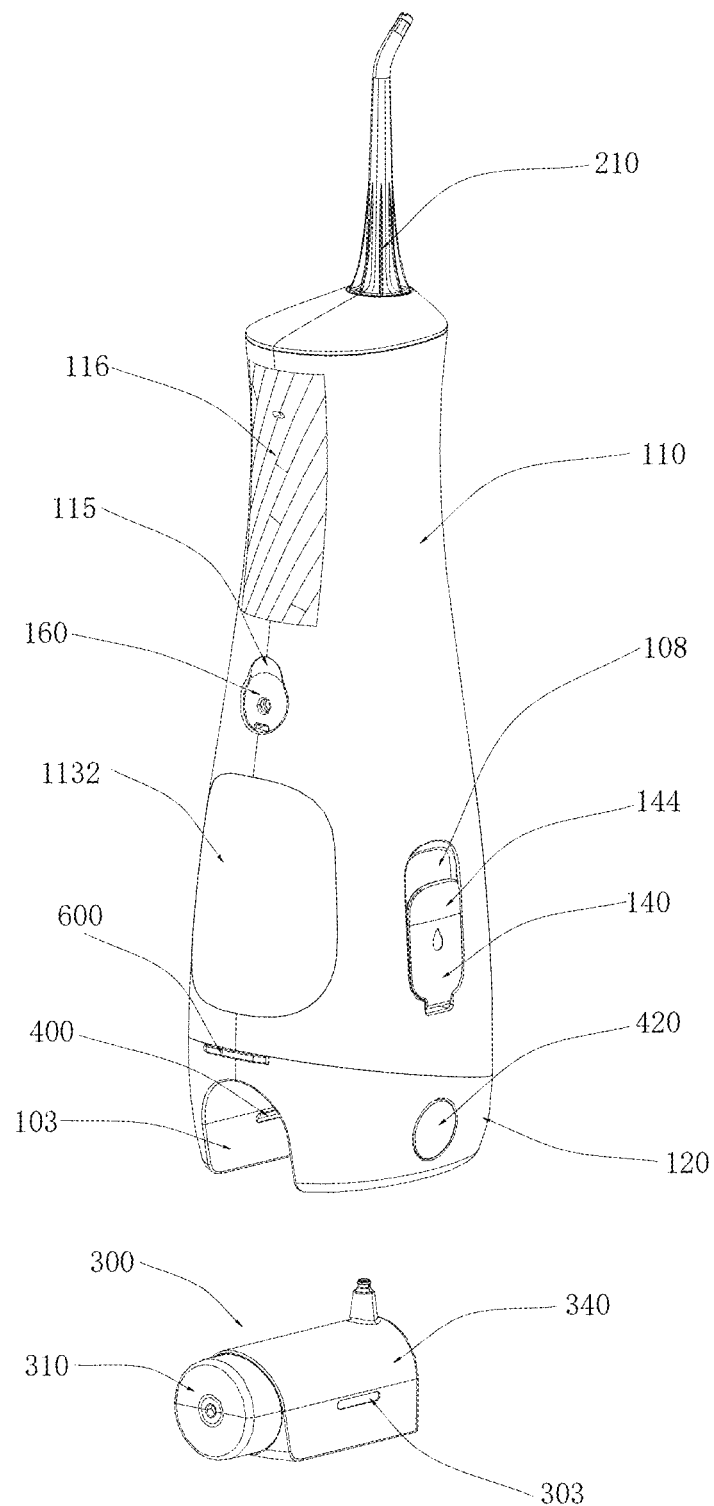
FIG. 2 is a first schematic structural diagram of a removed state of an oral rinse capsule of the present disclosure.
Figure 3:
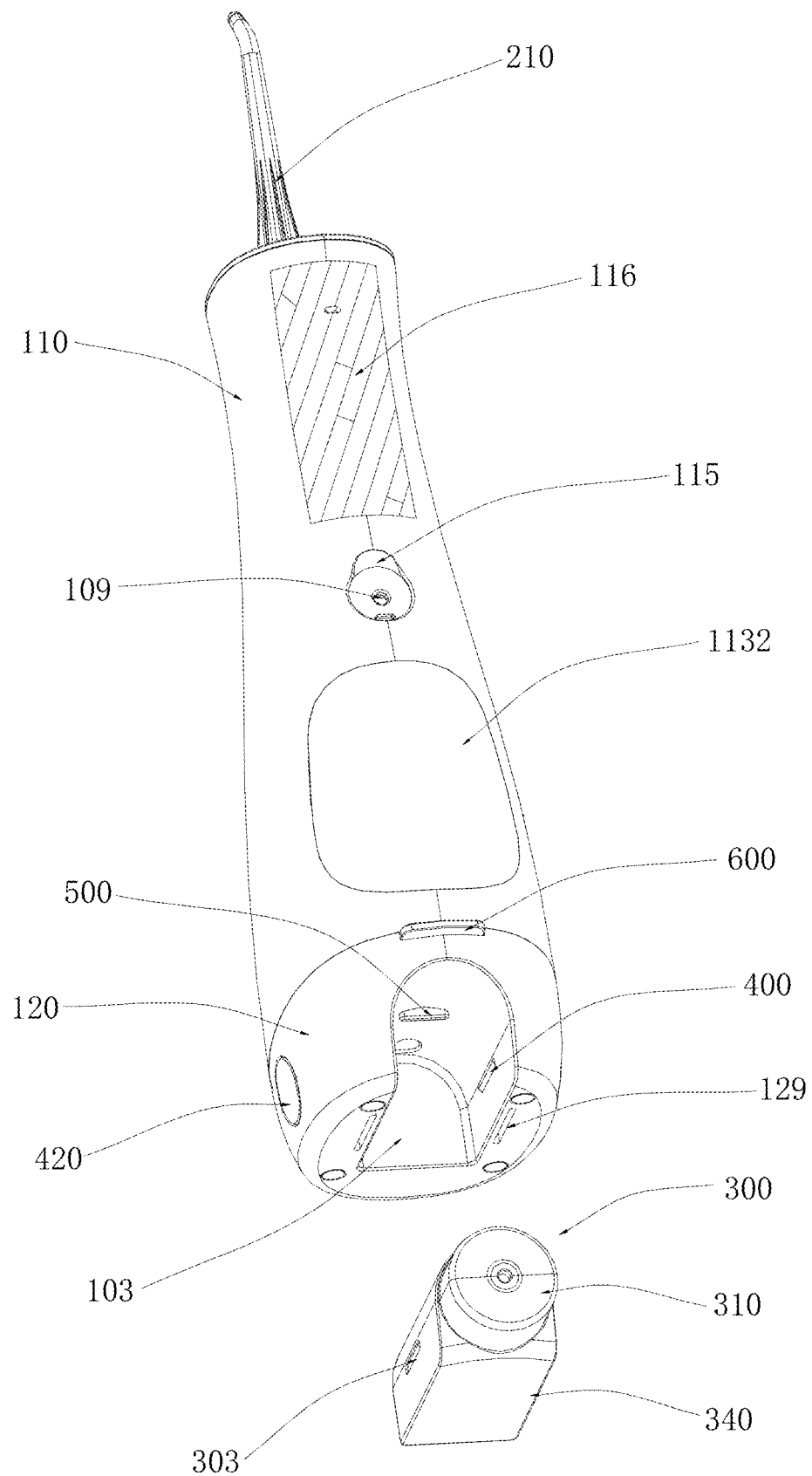
FIG. 3 is a first schematic structural diagram of a removed state of an oral rinse capsule of the present disclosure.
Figure 4:
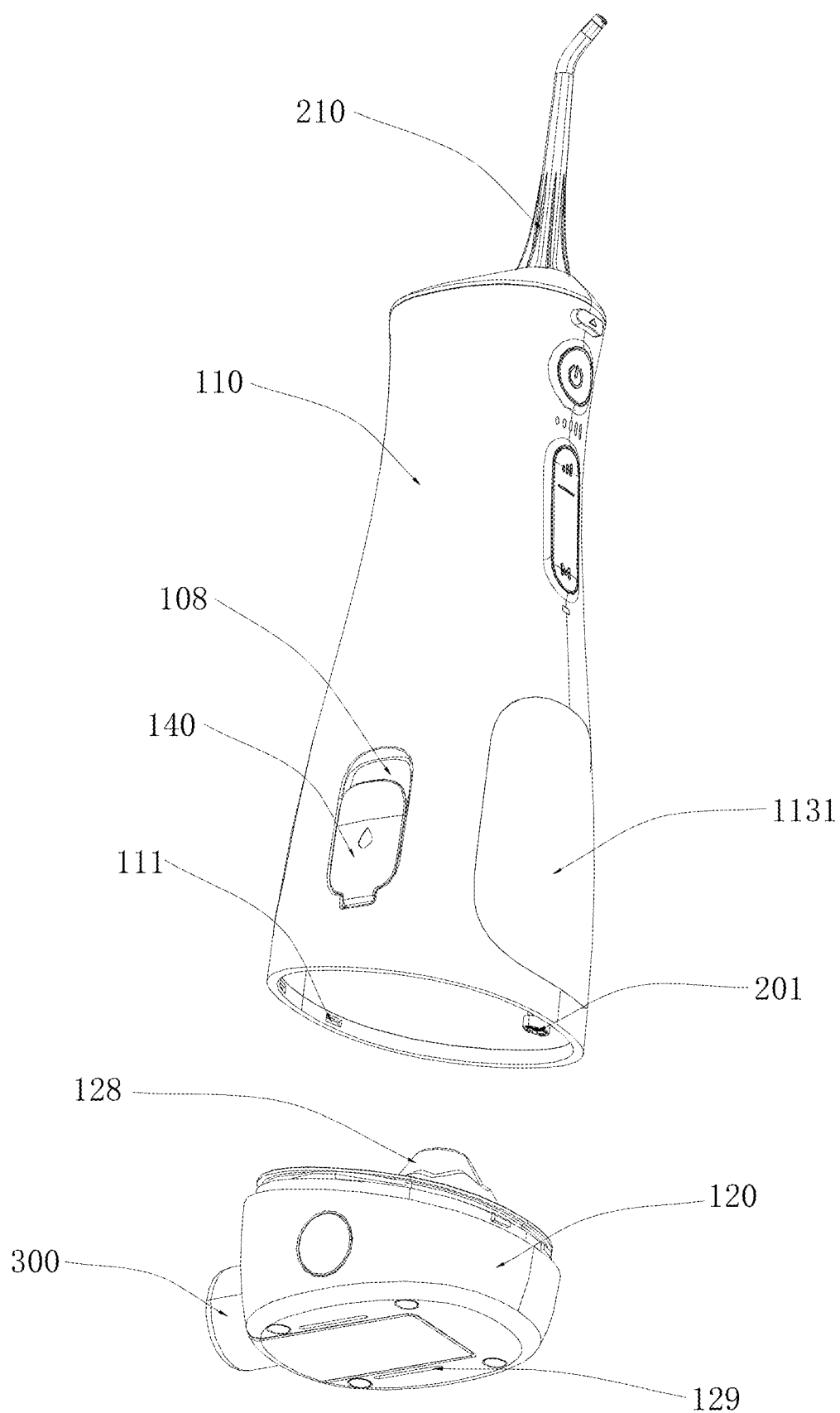
FIG. 4 is a schematic structural diagram of a separated state of an upper shell and a bottom shell of the present disclosure.
Figure 5:
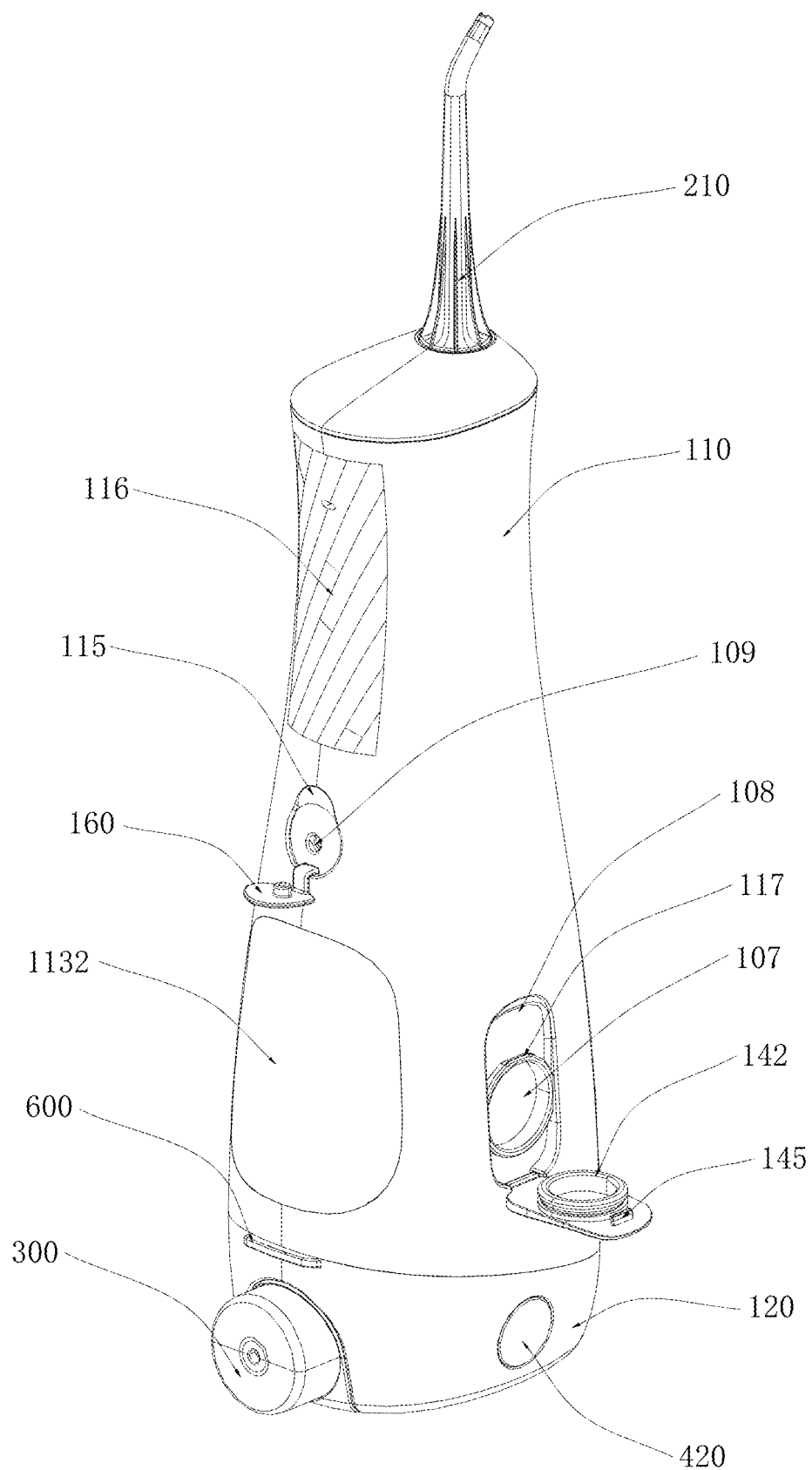
FIG. 5 is a schematic structural diagram of an opened state of a liquid injection cover and a charging cover of the present disclosure.
Figure 6:
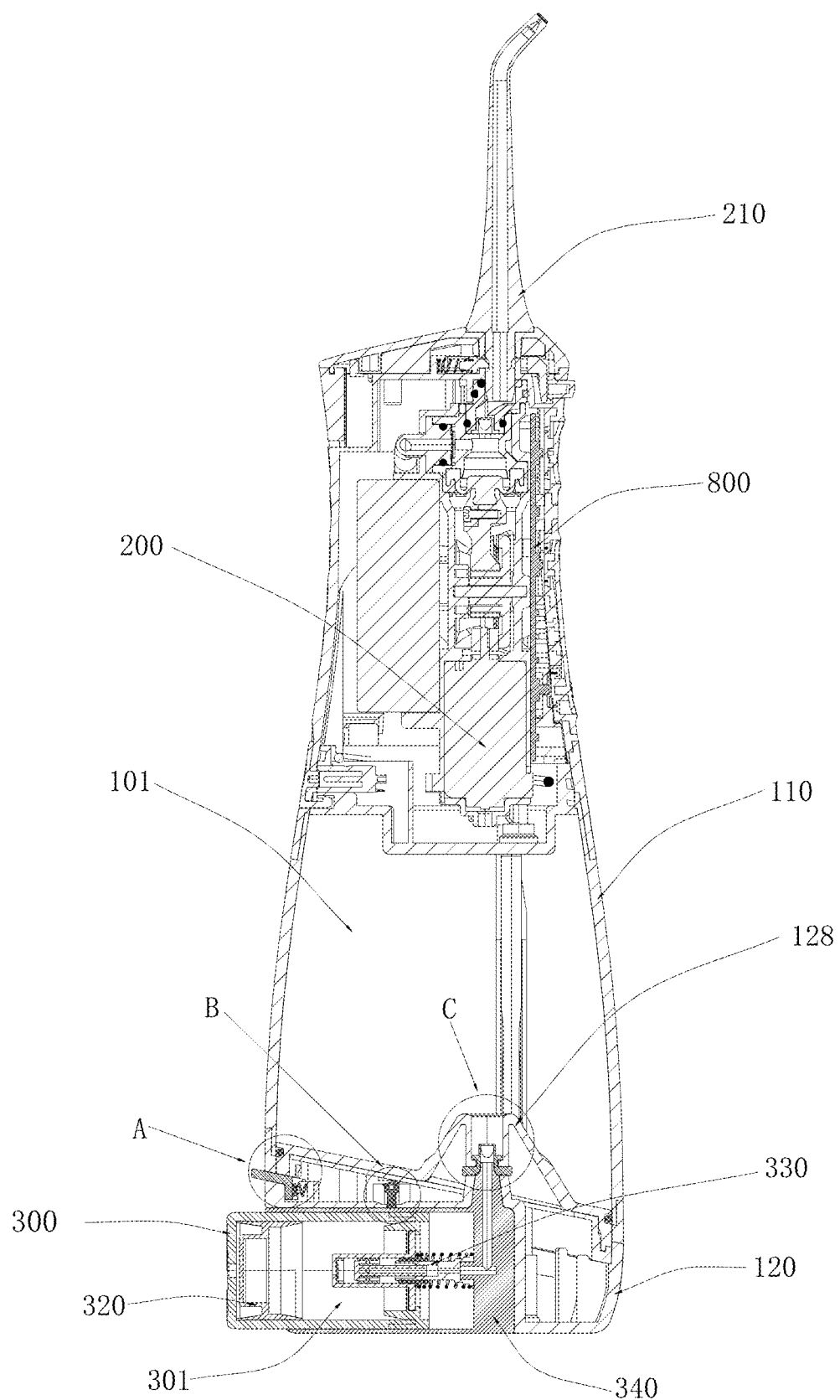
FIG. 6 is a schematic diagram of a cross-sectional structure of the present disclosure.
Figure 7:
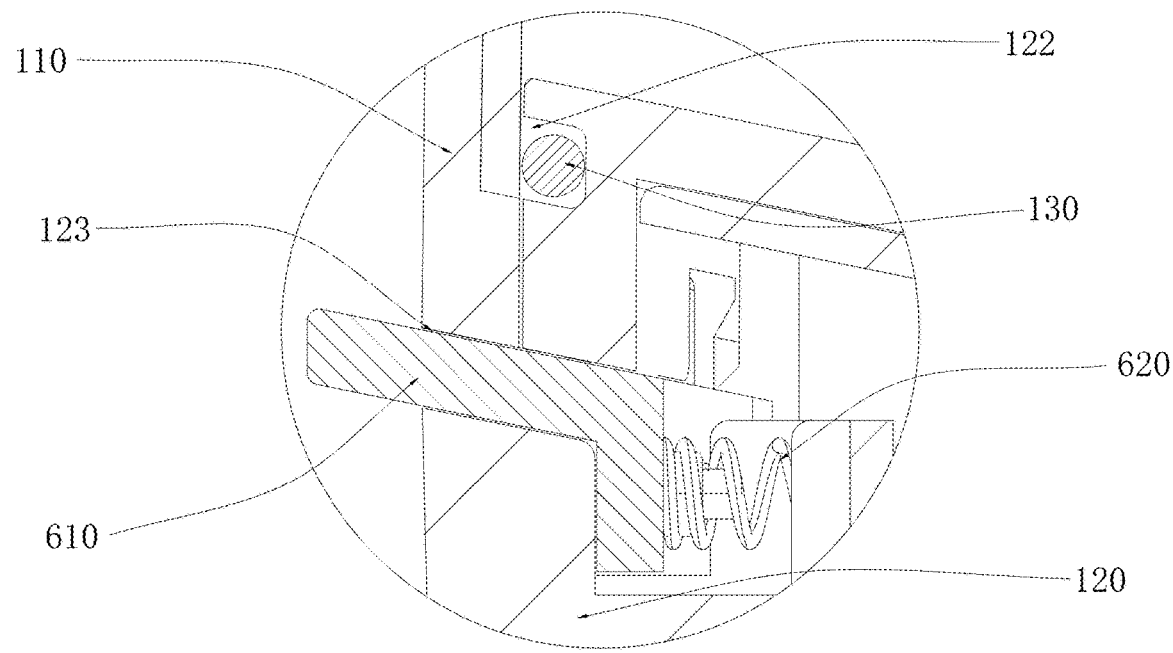
FIG. 7 is an enlarged view of circle A in FIG. 6.
Figure 8:
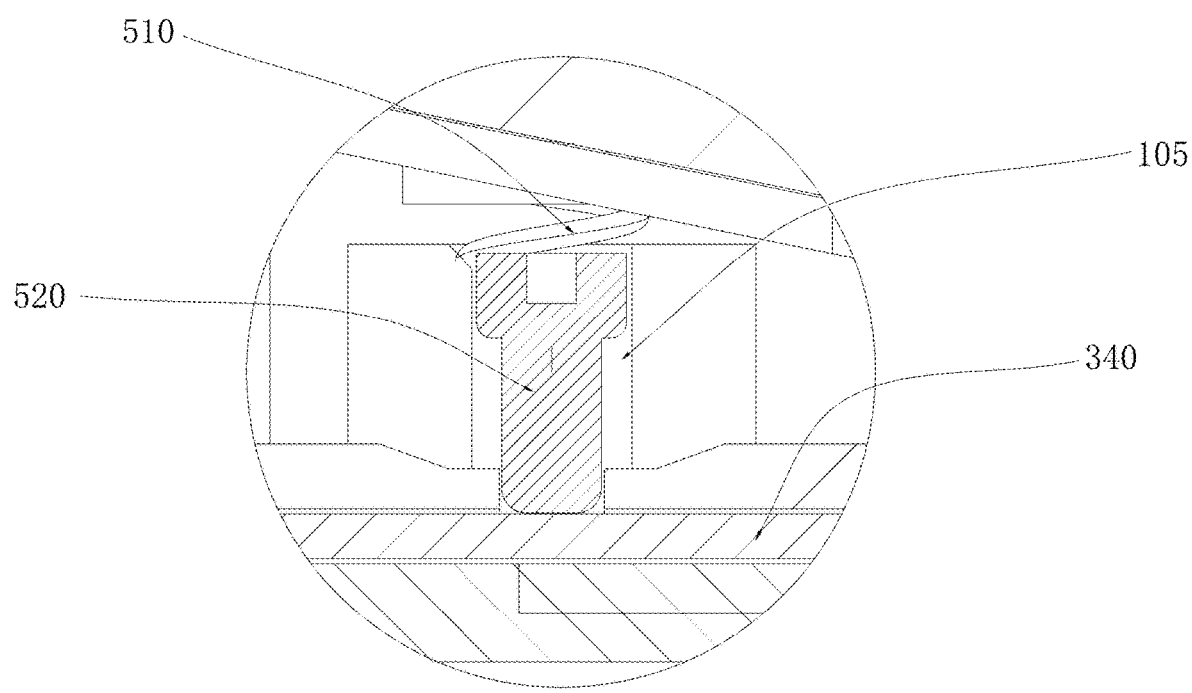
FIG. 8 is an enlarged view of circle B in FIG. 6.
Figure 9:
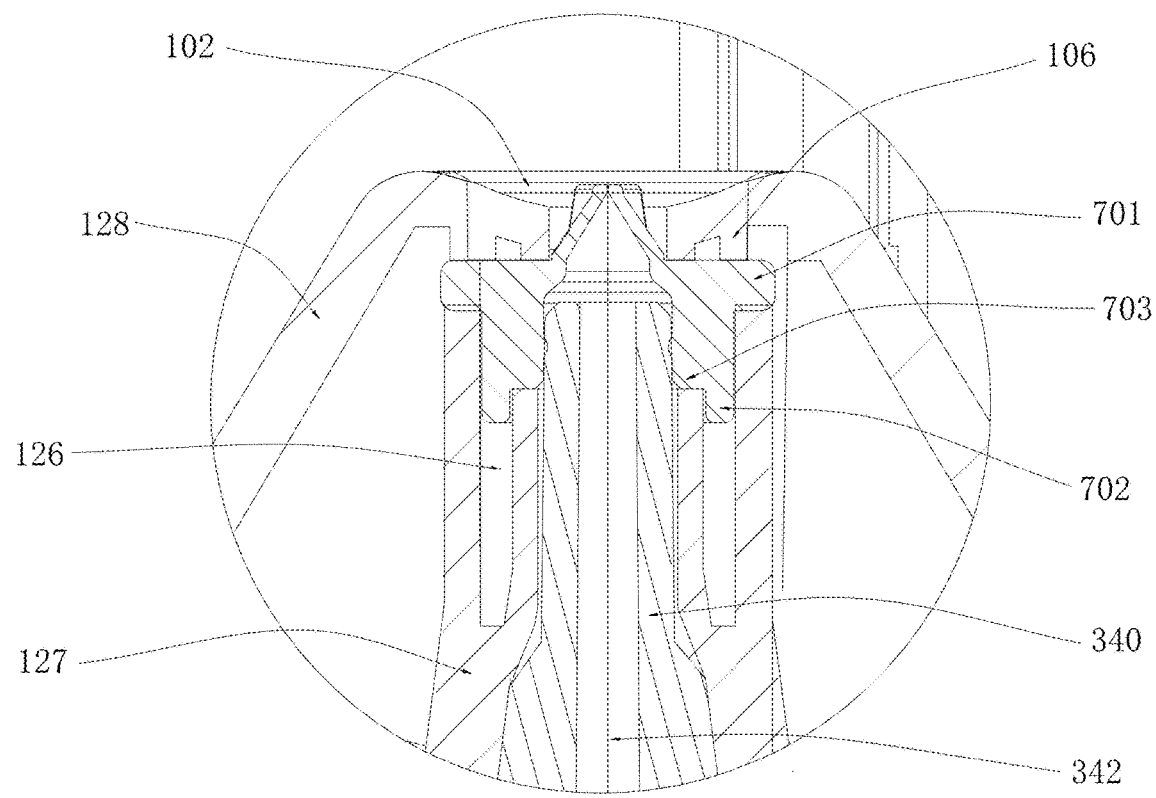
FIG. 9 is an enlarged view of circle C in FIG. 6.
Figure 10:
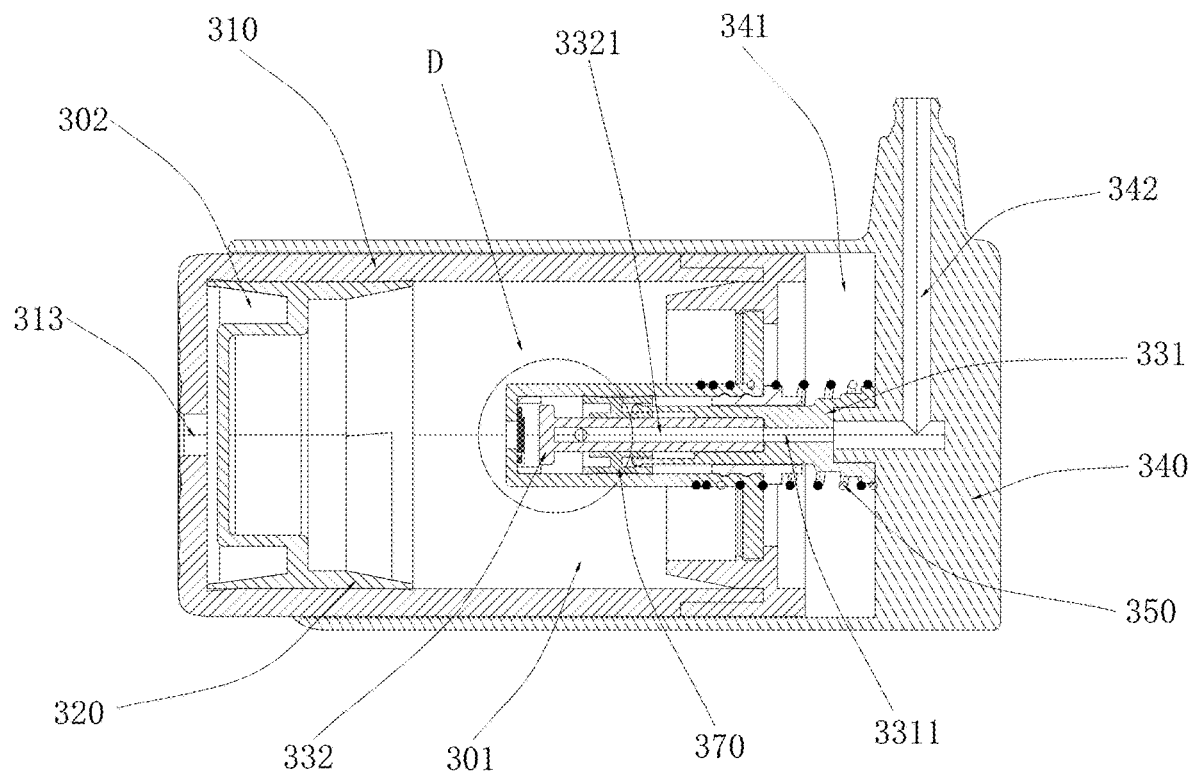
FIG. 10 is a sectional diagram of a pushed state of an oral rinse capsule of the present disclosure
Figure 11:
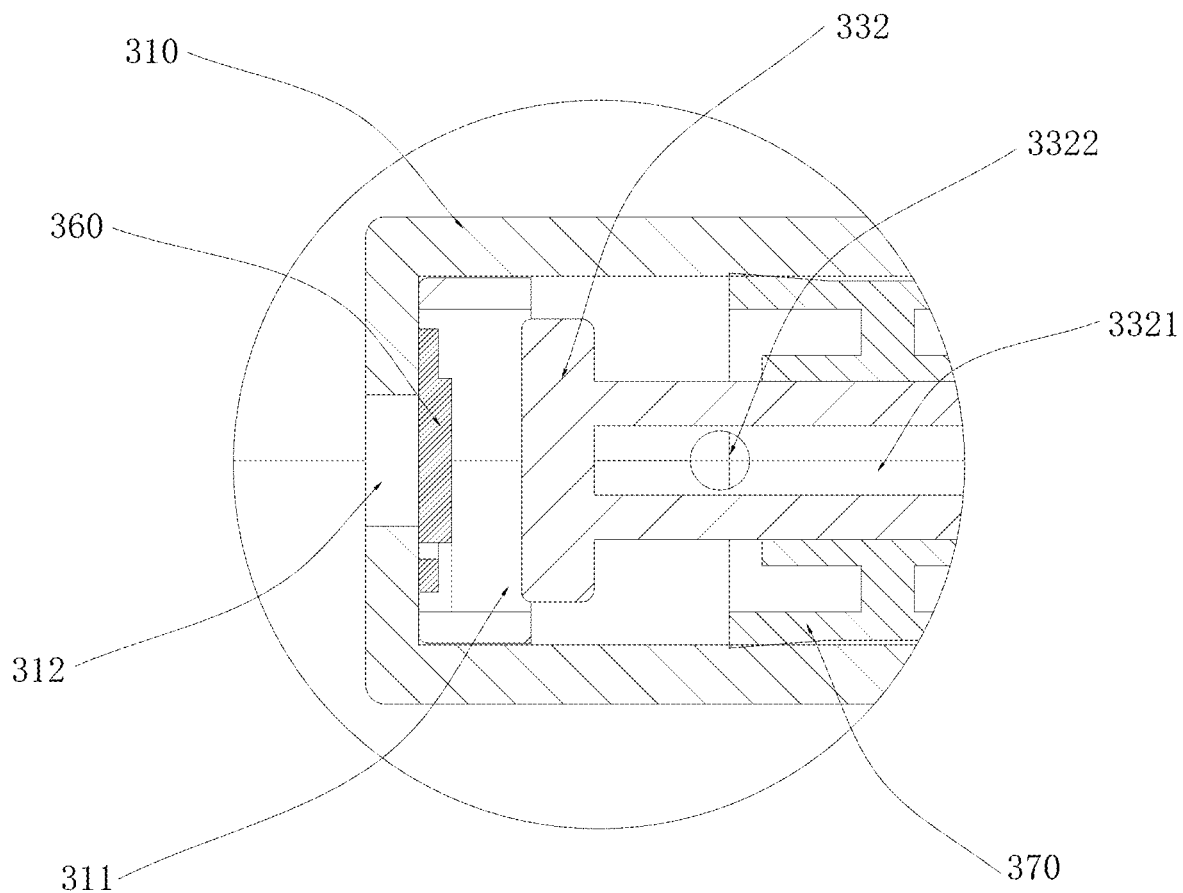
FIG. 11 is an enlarged view of circle D in FIG. 10.
Figure 12:
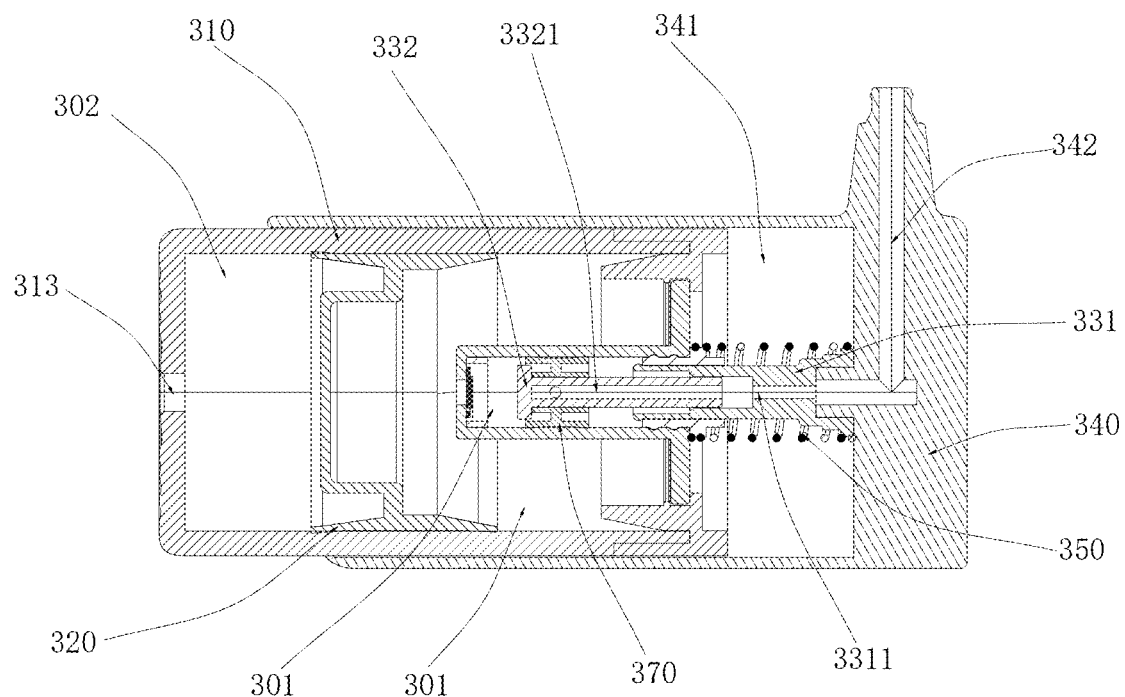
FIG. 12 is a sectional diagram of a released state of an oral rinse capsule of the present disclosure
Figure 13:
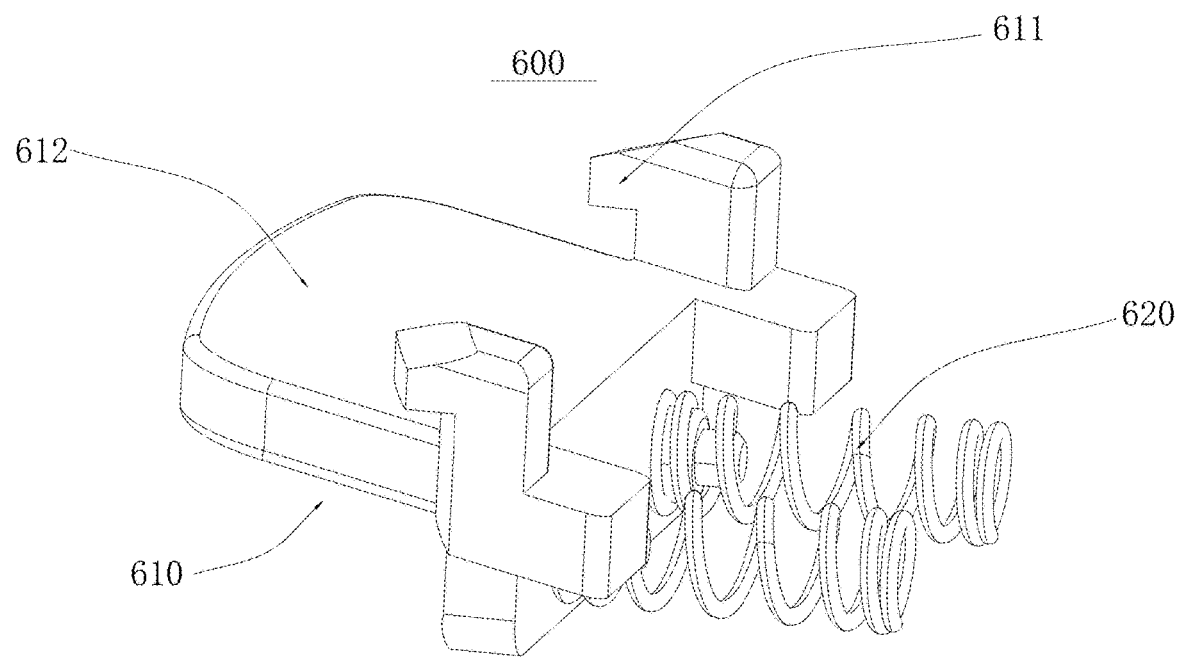
FIG. 13 is a schematic structural diagram of a lock catch assembly of the present disclosure.
Figure 14:
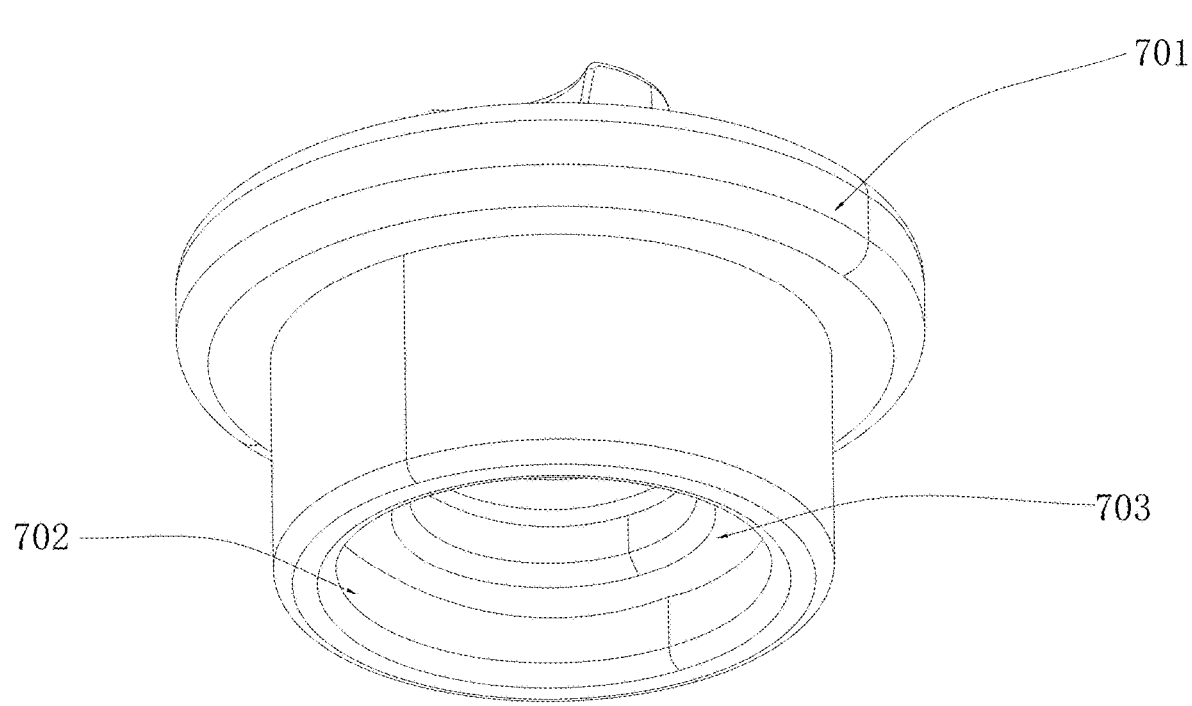
FIG. 14 is a schematic structural diagram of a second check valve of the present disclosure.
Figure 15:
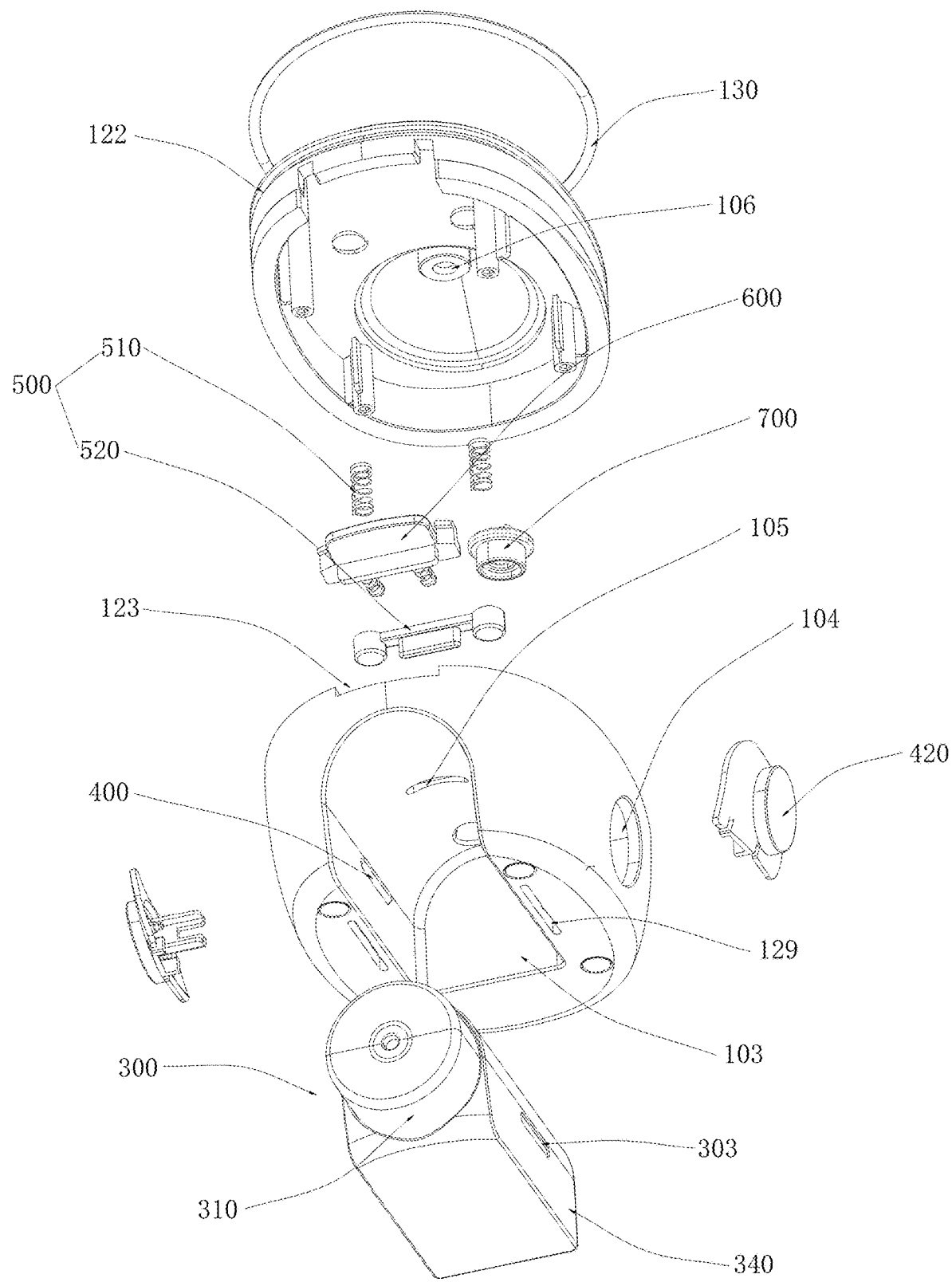
FIG. 15 is a schematic diagram of a first exploded structure of a bottom shell and an oral rinse capsule of the present disclosure.
Figure 16:
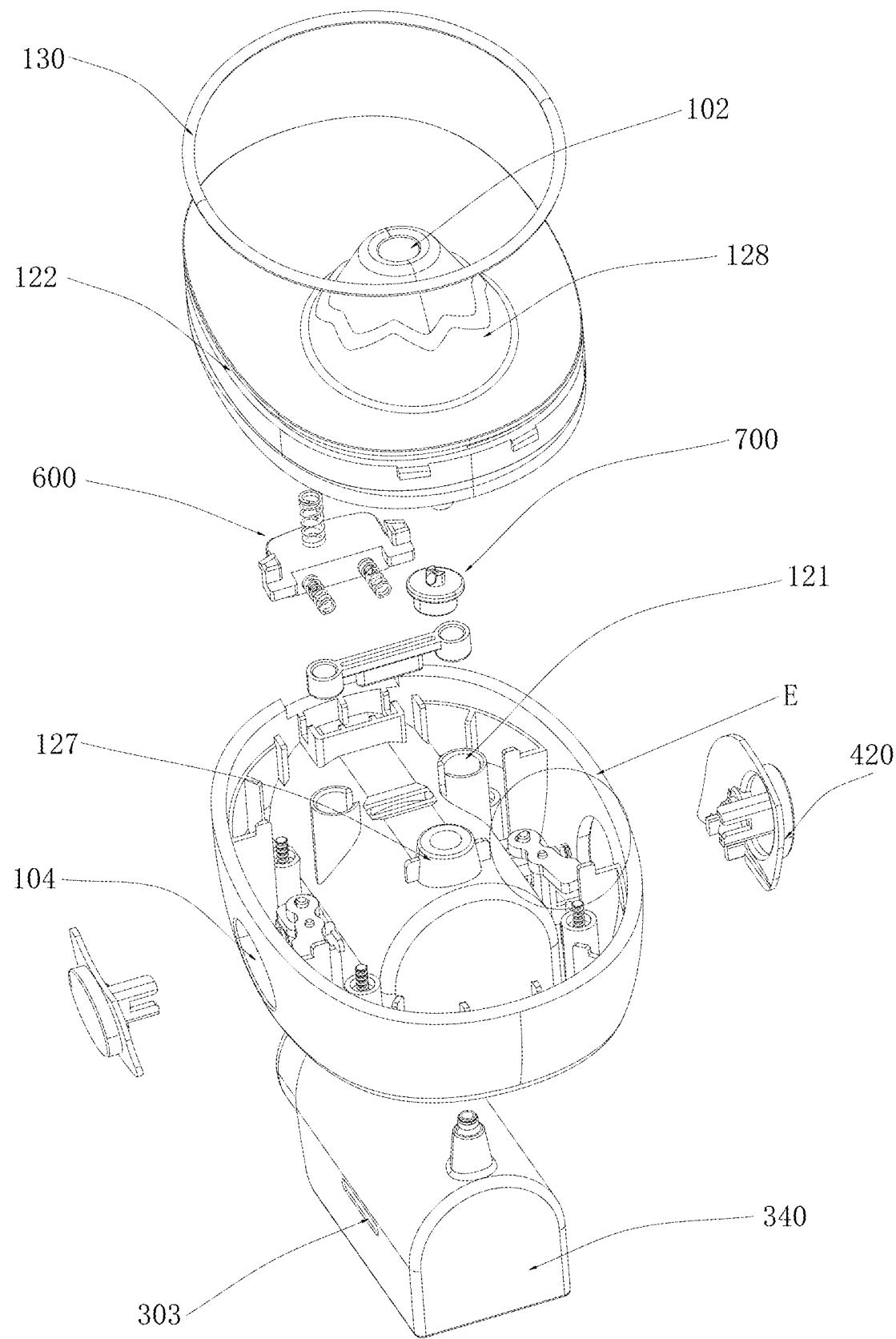
FIG. 16 is a schematic diagram of a second exploded structure of a bottom shell and an oral rinse capsule of the present disclosure.
Figure 17:
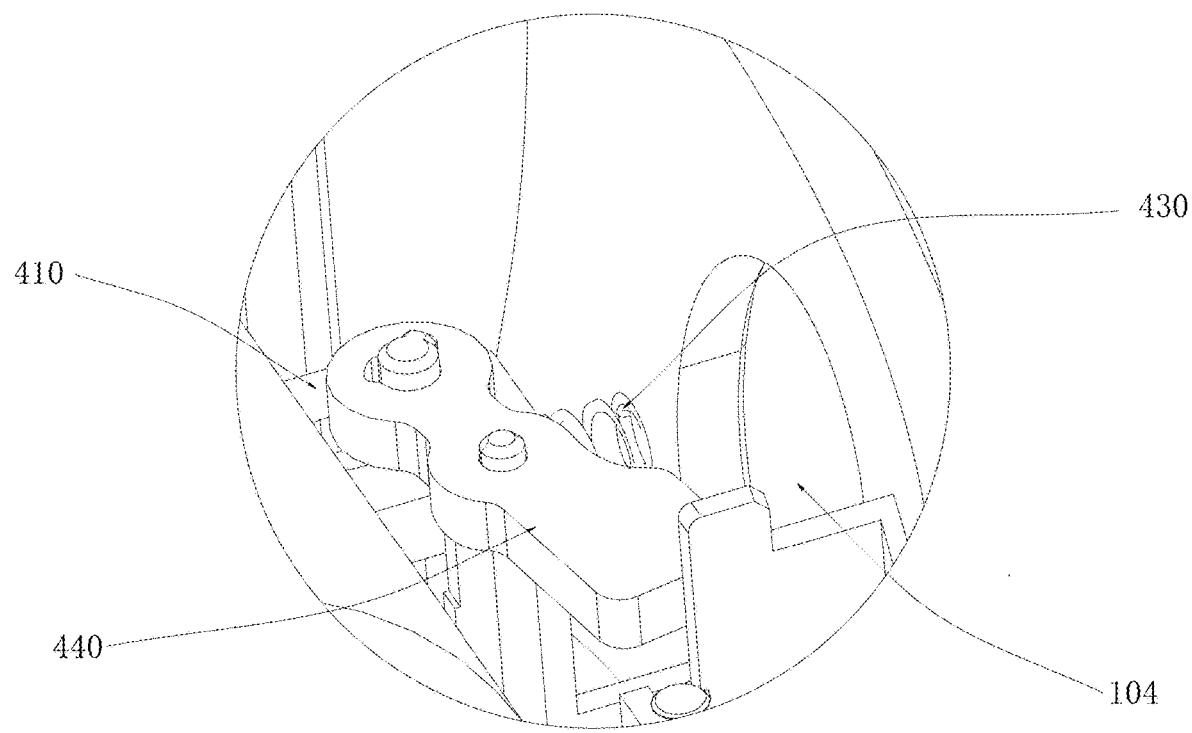
FIG. 17 is an enlarged view of circle E in FIG. 16.
Figure 18:
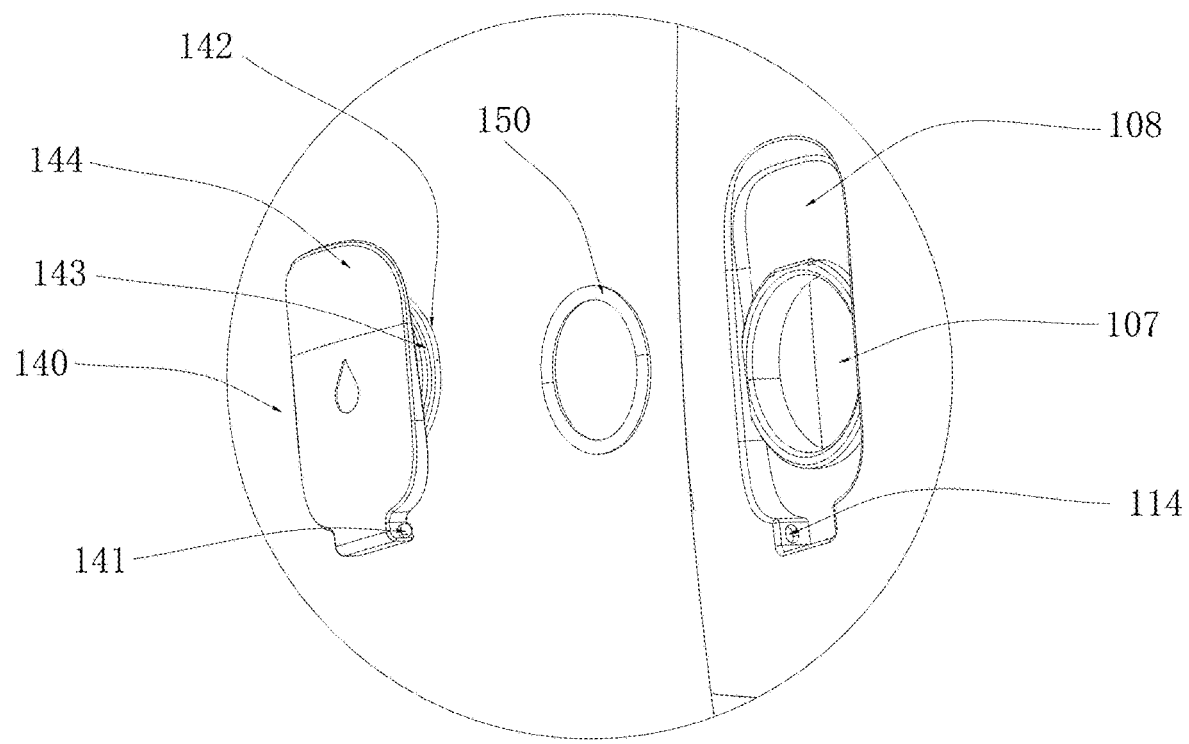
FIG. 18 is a partially schematic diagram of the present disclosure.

Referring to FIG. 1 to FIG. 18, a water flosser includes:
a shell 100, wherein a water storage chamber 101 and a liquid outlet 102 communicated to the water storage chamber 101 are provided inside the shell 100; the liquid outlet 102 is arranged at a bottom of the water storage chamber 101;
a pumping assembly 200, wherein the pumping assembly 200 is arranged in shell 100; a pumping port 201 of the pumping assembly 200 extends to a position, close to the liquid outlet 102, at the bottom of the liquid storage chamber 101; the pumping assembly 200 is configured to pump liquid and spray the liquid out along a nozzle 210;
An oral rinse capsule 300, the oral rinse accommodating chamber 301 is provided in the oral rinse capsule 300; the oral rinse capsule 300 is arranged at the bottom of the shell 100; the oral rinse accommodating chamber 301 is communicated to the liquid outlet 102; the oral rinse capsule 300 is configured to drive, under the action of an external force, oral rinse in the oral rinse accommodating chamber 301 to enter the water storage chamber 101 through the liquid outlet 102; and an axis where a force direction of the oral rinse capsule 300 is located is intersected with an axis or a projection of the shell 100 in a vertical direction.

By the arrangement of the above structure, during use, a user holds the shell 100 and can push the oral rinse capsule 300 at the bottom of the shell 100 at the same time to apply a force to the oral rinse capsule 300, and oral rinse in the oral rinse capsule is injected into the bottom of the water storage chamber 101, so that the pumping assembly 200 works. The pumping port 201 of the pumping assembly 200 extends to the bottom of the water storage chamber 101 and can pump liquid with higher concentration of oral rinse at the bottom of the water storage chamber 101, and the cleaning effect of the product is better. To maintain the center of gravity stable, the water flosser product usually has a narrow top and a wide bottom. The oral rinse capsule 300 is arranged at the bottom of the shell 100. The bottom of the shell 100 is typically a portion below a middle line of the shell 100 in the vertical direction, so that an oral rinse capsule 300 with a larger size can be allowed to be used, thereby prolonging the service time of the product, reducing the frequency of replacing the oral rinse capsule 300, and facilitating use.

In this embodiment, the oral rinse capsule 300 includes a capsule shell assembly 310, a piston assembly 330, and a connecting shell 340; an oral rinse accommodating chamber 301 is arranged in the capsule shell assembly 310; the capsule shell assembly 310 is further provided with a piston chamber 311; the piston chamber 311 is communicated to the oral rinse accommodating chamber 301 and is configured to be communicated to the liquid outlet 102 of the water flosser; the piston assembly 330 is slidably arranged in the piston chamber 311; the connecting shell 340 is provided with a sliding chamber 341; the capsule shell assembly 310 is slidably arranged in the sliding chamber 341; and when the capsule shell assembly 310 slides inwards along the sliding chamber 341 under the action of an external force, the piston assembly 330 slides into the piston chamber 311 to spray out the oral rinse in the piston chamber 311 along the liquid outlet 102 of the water flosser. The water flosser further includes a moving member 320; the moving member 320 is movably arranged in the capsule shell assembly 310; the oral rinse accommodating chamber 301 is formed between an inner wall of the moving member 320 and an inner wall of the capsule shell assembly 310; and the moving member 320 moves towards the piston assembly 330 under the action of an atmospheric pressure and a hydraulic pressure difference in the oral rinse accommodating chamber 301. By the arrangement of the above structure, during use, the capsule shell assembly 310 is pushed. The capsule shell assembly 310 and the moving member 320 move into the sliding chamber 341 in the force direction. At this time, the piston assembly 330 slides into the piston chamber 311, so that the pressure in the oral rinse accommodating chamber 301 increases. The oral rinse flows from the oral rinse accommodating chamber 301 into the piston chamber 311, and then flows into the water storage chamber 101 through the liquid outlet 102. The operation is simple. When the capsule shell assembly 310 is reset, the piston assembly 330 slides in a direction facing away from the piston chamber 311, and the pressure in the oral rinse accommodating chamber 301 decreases. The atmospheric pressure drives the moving member 320 to move inwards in an axis direction of the oral rinse capsule 300 to maintain a stable pressure in the oral rinse accommodating chamber 301.

In this embodiment, the oral rinse capsule 300 further includes a first elastic member 350; a first end of the first elastic member 350 abuts against the capsule shell assembly 310, and a second end of the first elastic member 350 abuts against an inner wall of the sliding chamber 341. By the arrangement of the above structure, during use, the capsule shell assembly 310 is pushed, and then the capsule shell assembly 310 slides in the sliding chamber 341 connected to the shell 340, thereby causing the piston assembly 330 to slide into the piston chamber 311. At this time, the first elastic member 350 deforms under the force, and the oral rinse in the oral rinse accommodating chamber 301 flows out. When the user releases the capsule shell assembly 310, the first elastic member 350 is reset, the capsule shell assembly 310 is driven to return to its initial position. Under the action of the atmospheric pressure, the moving member 320 moves inwards in the axis direction of the oral rinse capsule 300. The sliding chamber 341 of the connecting shell 340 can enable the capsule shell assembly 310 to move back and forth more smoothly, making operations of the user more effortless and convenient. Moreover, the connecting shell 340 can better connect the oral rinse capsule 300 with the shell 100 and protect the various components in it. The first elastic member 350 can achieve the resetting of the capsule shell assembly 310, making the operation more convenient.

In this embodiment, the connecting shell 340 is provided with a connecting channel 342; a first end of the connecting channel 342 is communicated to the piston chamber 311; and a second end of the connecting channel 342 is communicated to the liquid outlet 102. By the arrangement of the above structure, during use, the capsule shell assembly 310 is pushed, and the piston assembly 330 slides into the piston chamber 311, so that the pressure in the oral rinse accommodating chamber 301 increases. The oral rinse flows from the oral rinse accommodating chamber 301 into the piston chamber 311, passes through the connecting channel 342, and then flows into the water storage chamber 101 through the liquid outlet 102. The operation is simple. An oral rinse flowing channel is unblocked, and the structure of the product is stable.

In this embodiment, the piston assembly 330 includes a fixed rod 331 and a piston rod 332; the fixed rod 331 abuts against the shell 100 and is inserted into the piston chamber 311; and the piston rod 332 is slidably inserted into the piston chamber 311. By the arrangement of the above structure, during use, the capsule shell assembly 310 is pushed, and the capsule shell assembly 310 and the moving member 320 move in the force direction. At this time, the fixed rod 331 slides into the piston chamber 311, and the piston rod 332 moves with the capsule shell assembly 310 towards the fixed rod 331 until the piston rod 332 abuts against the fixed rod 331. At this time, the piston rod 332 continues to slide into the piston chamber 311 along with the fixed rod 331. The pressure in the piston chamber 311 increases. The oral rinse in the piston chamber 311 flows into the connecting channel 342 under the driving of the pressure and then flows into the water storage chamber 101 along the liquid outlet 102. When the user releases the capsule shell assembly 310, the first elastic member 350 is reset to drive the capsule shell assembly 310 return to its initial position. The fixed rod 331 slides in the direction facing away from the piston chamber 311. The atmospheric pressure drives the moving member 320 to move inwards in the axis direction of the oral rinse capsule 300. The pressure in the oral rinse accommodating chamber 301 drives the oral rinse to flow into the piston chamber 311, and the piston rod 332 slides in the direction facing away from the piston chamber 311. The piston rod 332 can slide relative to the piston chamber 311 under the action of the pressure and the fixed rod 331, so that the pressure in the piston chamber 311 and the pressure in the oral rinse accommodating chamber 301 can be adjusted, and the oral rinse can flow into the water storage chamber 101 along the connecting channel 342 and the liquid outlet 102.

In this embodiment, the fixed rod 331 is provided with a fixed rod channel 3311; the piston rod 332 is provided with a piston rod channel 3321; and the piston rod 332 is communicated to the piston chamber 311, the piston rod channel 3321, the connecting channel 342, and the liquid outlet 102 in sequence. By the arrangement of the above structure, during use, when the fixed rod 331 slides into the piston chamber 311, and the piston rod 332 moves with the capsule shell assembly 310 towards the fixed rod 331 until the piston rod 332 abuts against the fixed rod 331. At this time, the piston rod 332 continues to slide into the piston chamber 311 along with the fixed rod 331. The pressure in the piston chamber 311 increases. The oral rinse in the piston chamber 311 flows into the connecting channel 342 along the piston rod channel 3321 and the fixed rod channel 3311 under the driving of the pressure and finally flows out along the liquid outlet 102.

In this embodiment, the oral rinse capsule 300 further includes a first check valve 360; the capsule shell assembly 310 is provided with a first communication hole 312; the first communication hole 312 allows the oral rinse accommodating chamber 301 to be communicated to the piston chamber 311; the first check valve 360 is arranged in the first communication hole 312; and the first check valve 360 is configured to allow the oral rinse to flow unidirectionally from the oral rinse accommodating chamber 301 into the piston chamber 311. By the arrangement of the above structure, during use, when the fixed rod 331 slides into the piston chamber 311, and the piston rod 332 moves with the capsule shell assembly 310 towards the fixed rod 331 until the piston rod 332 abuts against the fixed rod 331. At this time, the piston rod 332 continues to slide into the piston chamber 311 along with the fixed rod 331. The first check valve 360 is closed, and the pressure in the piston chamber 311 increases, so that the oral rinse flows into the connecting channel 342 along the piston rod channel 3321 and the fixed rod channel 3311 and finally flows out along the liquid outlet 102. When the user releases the capsule shell assembly 310, the first elastic member 350 drives the capsule shell assembly 310 to be reset; the atmospheric pressure drives the moving member 320 to move inwards in the axis direction of the oral rinse capsule 300; the first check valve 360 is opened; and the pressure in the oral rinse accommodating chamber 301 drives the oral rinse to flow into the piston chamber 311.

In this embodiment, the oral cleaning liquid capsule 300 further includes a sealing member 370; the piston rod 332 is further provided with a second through hole 3322; the second through hole 3322 allows the piston chamber 311 to be communicated to the piston rod channel 3321; and the sealing member 370 slidably sleeves the piston rod 332 and closes or opens the second through hole 3322. By the arrangement of the above structure, during use, when the fixed rod 331 slides into the piston chamber 311, and the piston rod 332 moves with the capsule shell assembly 310 towards the fixed rod 331 until the piston rod 332 abuts against the fixed rod 331. At this time, the piston rod 332 continues to slide into the piston chamber 311 along with the fixed rod 331. The sealing member 370 moves relative to the piston rod 332, and the second through hole 3322 is opened, to allow the oral rinse to enter the piston rod channel 3321 through the second through hole 3322.

In this embodiment, the capsule shell assembly 310 is further provided with an air guide hole 313; an air pressure chamber 302 is formed between the inner wall of the moving member 320 and the inner wall of the capsule shell assembly 310; and the air guide hole 313 is configured to communicate the air pressure chamber 302 with an external atmosphere. By the arrangement of the above structure, the air guide hole 313 can communicate the external atmosphere to the air pressure chamber 302. When the pressure in the oral rinse accommodating chamber 301 decreases, the atmospheric pressure can drive the moving member 320 to move inwards, ensuring a stable pressure in the oral rinse accommodating chamber 301, thereby making it easier for the oral rinse to enter the water storage chamber 101 under the action of the piston assembly 330.

In this embodiment, a capsule accommodating chamber 103 is provided at the bottom of the shell 100; and the oral rinse capsule 300 is detachably inserted into the capsule accommodating chamber 103. By the arrangement of the above structure, a user can insert the oral rinse capsule 300 into the capsule accommodating chamber 103 during use. This is convenient to use, and the oral rinse capsule 300 can be freely replaced when the oral rinse in the oral rinse accommodating chamber 301 is used up. Moreover, to maintain the center of gravity stable, the water flosser product usually has a narrow top and a wide bottom. The oral rinse capsule 300 is arranged at the bottom of the shell 100, so that an oral rinse capsule 300 with a larger size can be allowed to be used, thereby prolonging the service time of the product, reducing the frequency of replacing the oral rinse capsule 300, and improving the user experience.

In this embodiment, a clamping slot 303 is provided on a surface of the oral rinse capsule 300; a clamping assembly 400 is arranged in the shell 100; a clamping end of the clamping assembly 400 is threaded out of an inner wall of the capsule accommodating chamber 103 of the shell 100 and is detachably clamped in the clamping slot 303. By the arrangement of the above structure, during use, the oral rinse capsule 300 is inserted into the capsule accommodating chamber 103, and the clamping end of the clamping assembly 400 is clamped into the clamping slot 303, which can effectively fix the oral rinse capsule 300 and make the structure of the product more stable. To remove the oral rinse capsule 300, the clamping end of the clamping assembly 400 is removed from the clamping slot 303, and the oral rinse capsule 300 is removed from the capsule accommodating chamber 103, making it convenient for a user to remove the oral rinse capsule 300 and facilitating the operation.

In this embodiment, the clamping assembly 400 includes a clamping member 410, a push member 420, and a second elastic member 430; the shell 100 is provided with a button hole 104; the push member 420 is arranged in the button hole 104; a first end of the second elastic member 430 abuts against the push member 420; a second end of the second elastic member 430 abuts against the clamping member 410; the elasticity of the second elastic member 430 drives the clamping member 410 to be inserted into the clamping slot 303; and when pushed by an external force, the push member 420 is configured to drive the clamping member 410 to be removed from the clamping slot 303. By the arrangement of the above structure, during use, the push member 420 is pushed to make the second elastic member 430 deform, and the push member 420 drives the clamping member 410 to move outwards. The clamping end of the clamping member 410 is removed from the clamping slot 303, making it easy to separate the oral rinse capsule 300 from the capsule accommodating chamber 103. When a user releases the push member 420, the second elastic member 430 is reset to drive the clamping member 410 to move inwards. The clamping end of the clamping member 410 is clamped in the clamping slot 303, so that the oral rinse capsule 300 can be stably connected to the capsule accommodating chamber 103; the stability of the product is improved; and assembling and disassembling are facilitated.

In this embodiment, the clamping assembly 400 further includes a transmission member 440; a first end of the transmission member 440 is rotatably connected to the push member 420; a middle part of the transmission member 440 is rotatably connected to the shell 100; and a second end of the transmission member 440 is rotatably connected to the clamping member 410. By the arrangement of the above structure, during use, the push member 420 is pushed to make the second elastic member 430 deform. The push member 420 inwards pushes the transmission member 440 to rotate around the middle part of the transmission member. The second end of the transmission member 440 drives the clamping member 410 to move outwards, so that the clamping end of the clamping member 410 is removed from the clamping slot 303. When a user releases the push member 420, the second elastic member 430 is reset to drive the clamping member 410 to move inwards. Meanwhile, the clamping member 410 drives the transmission member 440 to rotate around the middle part of the transmission member, and the transmission member 440 pushes the push member 420 to move outwards, so that the push member 420 is reset to its initial position.

In this embodiment, two clamping assemblies 400 included; and the two clamping assemblies 400 are arranged in the shell 100 and are respectively arranged on two sides of the capsule accommodating chamber 103. By the arrangement of the above structure, the two symmetrically arranged clamping assemblies 400 can be respectively clamped into the clamping slots 303 on the two sides of the oral rinse capsule 300, which can improve the structural stability of the product and prevent accidental touch by a user. The user needs to simultaneously push the push members 420 of the two clamping assemblies 400 to separate the oral rinse capsule 300 from the capsule accommodating chamber 103.

In this embodiment, the water flosser further includes a removal assembly 500; the removal assembly 500 includes a third elastic member 510 and a removal convex block 520; an open pore 105 is provided at an upper part of the inner wall of the capsule accommodating chamber 103; a first end of the third elastic member 510 abuts against the shell 100; a second end of the third elastic member 510 abuts against the removal convex block 520; an abutting end of the removal convex block 520 is threaded out of the open pore 105 and abuts against an upper surface of the oral rinse capsule 300. By the arrangement of the above structure, during use, when the clamping member 410 of the clamping assembly 400 is clamped into the clamping slot 303, the third elastic member 510 drives the removal convex block 520 to move towards the oral rinse capsule 300, and the removal convex block 520 abuts against the surface of the oral rinse capsule 300. When the clamping member 410 of the clamping assembly 400 is clamped into the clamping slot 303, the third elastic member 510 drives the removal convex block 520 to move towards the oral rinse capsule 300, and the removal convex block 520 pushes the oral rinse capsule 300 to separate the oral rinse capsule 300 from the capsule accommodating chamber 103, so that it is convenient for a user to replace the oral rinse capsule 300.

In this embodiment, the third elastic member 510 includes two springs; two spring accommodating slots 121 are provided on the shell 100; the two springs are respectively inserted into the two spring accommodating slots 121; second ends of the two springs respectively abut against two ends of the removal convex block 520 and are symmetrically arranged along an axis where the capsule accommodating chamber 103 is located. By the arrangement of the above structure, the two springs respectively abut against the two ends of the removal convex block 520, which can stably thread the removal convex block 520 out of the open pore 105. In addition, the spring accommodating slots 121 can allow the springs to be stably inserted, thereby limiting a deformation direction of the spring and improving the stability of the product.

In this embodiment, the shell 100 includes an upper shell 110 and a bottom shell 120; the bottom shell 120 is detachably connected to the upper shell 110; the water storage chamber 101 is formed between the upper shell 110 and the bottom shell 120; and the capsule accommodating chamber 103 is arranged on the bottom shell 120. By the arrangement of the above structure, the upper shell 110 and the bottom shell 120 are detachable, so that a user can be allowed to remove the bottom shell 120 to open the water storage chamber 101, making it convenient for the user to clean the water storage chamber 101, ensuring the cleanliness of the water storage chamber 101, and ensuring the oral safety of the user.

In this embodiment, the water flosser further includes a first sealing ring 130; a first sealing groove 122 is provided at an upper edge of the bottom shell 120; the first sealing ring 130 is inserted into the first sealing groove 122; and an outer surface of the first sealing ring 130 abuts against an inner wall of the upper shell 110. By the arrangement of the above structure, during use, the bottom shell 120 is mounted on the upper shell 110. At this time, the outer surface of the first sealing ring 130 abuts against the inner wall of the upper shell 110, and an inner surface and upper and lower surfaces of the first sealing ring 130 abut against an inner wall of the first sealing groove 122, which can increase the sealing performance of the product, prevent the liquid in the water storage chamber 101 from leaking.

In this embodiment, the water flosser further includes a lock catch assembly 600; the lock catch assembly 600 includes a lock catch member 610 and a fourth elastic member 620; a first end of the fourth elastic member 620 abuts against the bottom shell 120; a second end of the fourth elastic member 620 abuts against the lock catch member 610; and the lock catch member 610 is locked on the upper shell 110. By the arrangement of the above structure, the elastic force of the fourth elastic member 620 drives the lock catch member 610 to lock the lock catch member 610 to the upper shell 110, thereby improving the stability of connection between the upper shell 110 and the bottom shell 120.

In this embodiment, a lock catch slot 111 is provided on the upper shell 110; and a lock catch portion 611 of the lock catch member 610 is detachably clamped into the lock catch slot 111. By the arrangement of the above structure, the elastic force of the fourth elastic member 620 drives the lock catch member 610 to lock the lock catch portion 611 of the lock catch member 610 to be clamped in the lock catch slot 111, so that the connection between the upper shell 110 and the bottom shell 120 is stable.

In this embodiment, an open slot 123 is provided on the bottom shell 120; a removal portion 612 of the lock catch member 610 is threaded out along the open slot 123; and the removal portion 612 of the lock catch member 610 is configured to be pushed by a user, so that the lock catch portion 611 of the lock catch member 610 is removed from the lock catch slot 111. By the arrangement of the above structure, during use, the removal portion is pushed to cause the fourth elastic member 620 to deform, and the lock catch portion of the lock catch member 610 is removed from the lock catch slot 111, so that a user can remove the bottom shell 120 from the upper shell 110. When the user releases the removal portion, the fourth elastic member 620 is reset and pushes the lock catch portion of the lock catch member 610 to be clamped into the lock catch slot 111, so that the connection between the upper shell 110 and the bottom shell 120 is stable.

In this embodiment, the water flosser further includes a second check valve 700; the shell 100 downwards extends along an edge of the liquid outlet 102 to form a first abutment block 106; a protruding second abutment block 127 is arranged in the shell 100; the second abutment block 127 is arranged towards the first abutment block 106; the second check valve 700 is provided with an abutment board 701; the first abutment block 106 abuts against an upper surface of the abutment board 701, and the second abutment block 127 abuts against a lower surface of the abutment board 701, to limit the second check valve 700 between the first abutment block 106 and the second abutment block 127; and the second check valve 700 is configured to allow the oral rinse to unidirectionally flow into the water storage chamber 101 along the liquid outlet 102. By the arrangement of the above structure, during use, the second check valve 700 allows the oral rinse to only flow unidirectionally into the water storage chamber 101 along a mounting channel 106 and the liquid outlet 102, to prevent liquid in the water storage chamber 101 from flowing back into the oral rinse capsule 300, ensure the concentration of the oral rinse in the oral rinse capsule 300, and guarantee the cleaning efficiency of the oral rinse. The first abutment block 106 abuts against the upper surface of the abutment board 701, and the second abutment block 127 abuts against the lower surface of the abutment board 701. This can effectively fix the second check valve 700, improve the stability of the product, and further improve the sealing performance of the product to prevent leakage of the oral rinse and the like. The first abutment block 106 and the second abutment block 127 are in interference fit with the surfaces of the abutment board 701, which further improves the sealing performance of the product to prevent water leakage.

In this embodiment, the second abutment block 127 is provided with an insertion slot 126; the second check valve 700 is provided with an insertion block 702; the insertion block 702 downwards extends along the lower surface of the abutment board 701; and the insertion block 702 is inserted into the insertion slot 126. By the arrangement of the above structure, during use, the insertion block 702 is inserted into the insertion slot 126. At this time, an outer surface of the insertion block 702 is fitted to a surface of an inner wall of the insertion slot 126, which can effectively limit the insertion block 702, thereby limiting the mounting position of the second check valve 700. The product has a more stable structure. Meanwhile, the outer surface of the insertion block 702 is fitted to the surface of the inner wall of the insertion slot 126, which can further improve the sealing performance of the product.

In this embodiment, the insertion block 702 is provided with a limiting board 703; and an end surface of an inner side wall of the insertion slot 126 abuts against the limiting board 703. By the arrangement of the above structure, during use, the insertion block 702 is inserted along the insertion slot 126 until the end surface of the inner side wall of the insertion slot 126 abuts against the limiting board 703 and reaches the mounting position. The limiting board 703 can effectively limit an insertion depth to make the product connected more stably. Meanwhile, the end surface of the inner side wall of the insertion slot 126 can further support the limiting board, thereby allowing an inner side of a lower surface of the first abutment block 106 to be in interference fit with the upper surface of the abutment board 701, which further improves the sealing performance and stability of the product.

In this embodiment, a position, close to the liquid outlet 102, on an upper surface of the bottom shell 120 protrudes upwards to form a protrusion 128, and the liquid outlet 102 is arranged at a top of the protrusion 128. By the arrangement of the above structure, the liquid outlet 102 is arranged at the top of the protrusion 128, to enlarge a contact area between the oral rinse flowing through the liquid outlet 102 and water. The oral rinse quickly diffuses into the water in the water storage chamber 101, so that the product has a better cleaning effect and is more stable.

In this embodiment, the upper surface of the bottom shell 120 is inclined; a pumping space is formed between the protrusion 128 and the lowest side of the upper surface of the bottom shell 120. The pumping port 201 of the pumping assembly 200 extends to the pumping space. By the arrangement of the above structure, during use, when the water in the water storage chamber 101 is reduced, water flows into the pumping space under the action of the gravity. The pumping port 201 of the pumping assembly 200 extends to the pumping space, which can effectively pump the liquid in the pumping space completely, thereby improving the pumping efficiency of the pumping assembly 200, preventing liquid accumulation, and increasing the liquid utilization efficiency.

In this embodiment, a transparent observation window is provided at a bottom of a side wall of the upper shell 110. The observation window is configured to allow a user to observe a liquid level position inside the water storage chamber 101. By the arrangement of the above structure, a user can observe the liquid level position inside the water storage chamber 101 through the observation window during use, so that the user can timely learn a working state of the product and add water, achieving a better user experience. Meanwhile, it can prevent the pumping assembly 200 from idling and prolong the service life of the product.

In this embodiment, the observation window includes a front observation window unit 1131 and a rear observation window unit 1132. The front observation window unit 1131 and the rear observation window unit 1132 are respectively arranged on a front side and a rear side of the upper shell 110. By the arrangement of the above structure, the front observation window unit 1131 and the rear observation window unit 1132 which are arranged separately can enable a user to observe the liquid level position inside the water storage chamber 101 on both the front and rear sides of the product, facilitating the use by the user. Furthermore, the appearance of the product is more beautiful. Preferably, the front observation window unit 1131 is approximately a trapezoid with four rounded corners, and the rear observation window unit 1132 is approximately a trapezoid with four rounded corners. A ratio of an area of the front observation window unit 1131 to an area of the rear observation window unit 1132 is about 1.2-1.8, and the front observation window unit 1131 is opposite to the rear observation window unit 1132.

In this embodiment, the water flosser further includes a liquid injection cover 140; the upper shell 110 is provided with a liquid injection port 107; the liquid injection port 107 is communicated to the water storage chamber 101. The liquid injection cover 140 is detachably covered at the liquid injection port 107. By the arrangement of the above structure, the liquid injection cover 140 is opened, so that water can be injected into the water storage chamber 101 through the liquid injection port 107, making it convenient for a user to add water at any time. During use, the liquid injection cover 140 is covered at the liquid injection port 107 to prevent water from flowing out and improve the sealing performance of the product.

In this embodiment, a rotating shaft hole 114 is arranged at a position of the upper shell 110 close to the liquid injection port 107. A rotating shaft 141 is arranged at a connecting end of the liquid injection cover 140. The rotating shaft 141 is rotatably inserted into the rotating shaft hole 114, so that the liquid injection cover 140 can be detachably covered at the liquid injection port 107. By the arrangement of the above structure, the liquid injection cover 140 is rotated to be removed from the liquid injection port 107, and water can be injected into the water storage chamber 101 through the liquid injection port 107. During use, the liquid injection cover 140 is rotated to a covering position, and the liquid injection cover 140 is covered at the liquid injection port 107 to prevent water from flowing out and improve the sealing performance of the product.

In this embodiment, the water flosser further includes a second sealing ring 150. A protruding sealing block 142 is arranged on one side of the liquid injection cover 140 facing the upper shell 110. The sealing block 142 is provided with a second sealing groove 143. The second sealing ring 150 is inserted into the second sealing groove 143. An outer surface of the second sealing ring 150 abuts against an edge of the liquid injection port 107. By the arrangement of the above structure, when the liquid injection cover 140 is covered at the liquid injection port 107, the outer surface of the second sealing ring 150 abuts against the edge of the liquid injection port 107, and an inner surface and upper and lower surfaces of the second sealing ring 150 abut against the second sealing groove 143, which can further improve the sealing performance between the liquid injection cover 140 and the liquid injection port 107 and prevent water from flowing out along a gap between the liquid injection cover 140 and the liquid injection port 107.

In this embodiment, a position of the upper shell 110 close to the liquid injection port 107 is inwards recessed to form an accommodating slot 108. When the liquid injection cover 140 is covered at the liquid injection port 107, the liquid injection cover 140 is basically accommodated in the accommodating slot 108. By the arrangement of the above structure, when the liquid injection cover 140 is covered at the liquid injection port 107, the liquid injection cover 140 is basically accommodated in the accommodating slot 108. At this time, an outer surface of the liquid injection cover 140 is basically leveled with the upper shell 110, which not only makes the appearance of the product more beautiful, but also prevents a user from scratching and opening the liquid injection cover 140, thereby improving the stability of the product.

In this embodiment, a free end of the liquid injection cover 140 is bent outwards to form a pull portion 144. When the liquid injection cover 140 is covered at the liquid injection port 107, a gap exists between the pull portion 144 and the accommodating slot 108. By the arrangement of the above structure, when the liquid injection cover 140 is opened, a user places a finger into the gap between the pull portion 144 and the accommodating slot 108, moves the pull portion 144 outwards, and then rotates the liquid injection cover 140. It is convenient for the user to open the liquid injection cover 140.

In this embodiment, a first buckle 145 is arranged at a position of the liquid injection cover 140 close to the sealing block 142, and a second buckle 117 is arranged at the edge of the liquid injection port 107. The first buckle 145 is clamped to the second buckle 117. By the arrangement of the above structure, when the liquid injection cover 140 is covered at the liquid injection port 107, the first buckle 145 is clamped to the second buckle 117, thereby connecting the free end of the liquid injection cover 140 to the upper shell 110 to hinder the rotation of the liquid injection cover 140, and improving the stability of the product.

In this embodiment, the water flosser further includes a control panel 800. The control panel 800 is arranged in the upper shell 110. The pumping assembly 200 is electrically connected to the control panel 800. The upper shell 110 is provided with a charging port 109. A charging terminal in the charging port 109 is electrically connected to the control panel 800. By the arrangement of the above structure, the charging terminal in the charging port 109 can be connected to the control panel 800 and an external power supply, which can charge the product and improve the battery life of the product.

In this embodiment, the water flosser further includes a charging cover 160. The charging cover 160 is detachably covered at the charging port 109. By the arrangement of the above structure, during charging, the charging cover 160 is opened to allow an output end of a charger to be inserted into the charging port 109, thereby achieving charging. During use, the charging cover 160 is covered at the charging port 109, which can prevent impurities such as water and dust from entering the charging port 109, thereby improving the safety of the product.

In this embodiment, an insertion slot 115 is provided at an edge of the upper shell 110 close to the charging port 109, and the insertion slot 115 is configured to allow a user to put a finger in. By the arrangement of the above structure, due to the arrangement of the insertion slot 115, it is convenient for a user to put a finger into the insertion slot 115 and open the charging cover 160. The operation of the user is facilitated.

In this embodiment, a friction holding portion 116 is arranged on a surface of the upper shell 110. The friction holding portion 116 is provided with friction lines. By the arrangement of the above structure, the friction lines at the friction holding portion 116 can increase the friction coefficient, so that the product is more stable when a user holds the product, and the appearance of the product is more beautiful.

In this embodiment, the upper shell 110 has a narrow top and a wide bottom, and the friction holding portion 116 is arranged at an upper part of the upper shell 110. By the arrangement of the above structure, the friction holding portion 116 is arranged at the upper part of the upper shell 110. At this time, the thickness of the upper shell 110 is proper, making it convenient for a user to hold the product.

In this embodiment, the bottom shell 120 is provided with a water leaking slot 129. The water leaking slot 129 is communicated to an internal space of the bottom shell 120. By the arrangement of the above structure, during use, the water leaking slot 129 can allow the water accumulated in the bottom shell 120 to flow out, which ensures the dryness in the product and prevent germination of bacteria. Preferably, the water leaking slot 129 is arranged at a bottom of the bottom shell 120.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A water flosser, comprising:
    a shell, wherein a water storage chamber and a liquid outlet communicated to the water storage chamber are provided inside the shell, and the liquid outlet is located at a bottom of the water storage chamber;
    a pumping assembly, wherein the pumping assembly is arranged in the shell; a pumping port of the pumping assembly extends to a position, close to the liquid outlet, at the bottom of the water storage chamber; the pumping assembly is configured to pump liquid and spray the liquid out along a nozzle; and
    an oral rinse capsule, wherein an oral rinse accommodating chamber is provided in the oral rinse capsule; the oral rinse capsule is arranged at a bottom of the shell; the oral rinse accommodating chamber is communicated to the liquid outlet; and the oral rinse capsule is configured to drive, under the action of an external force, oral rinse in the oral rinse accommodating chamber to enter the water storage chamber through the liquid outlet.

2. The water flosser according to claim 1, wherein an axis where a force direction of the oral rinse capsule is located is intersected with an axis or a projection of the shell in a vertical direction; the oral rinse capsule includes a capsule shell assembly, a piston assembly, and a connecting shell; the oral rinse accommodating chamber is arranged in the capsule shell assembly; the capsule shell assembly is further provided with a piston chamber; the piston chamber is communicated to the oral rinse accommodating chamber and is configured to be communicated to the liquid outlet of the water flosser; the piston assembly is slidably arranged in the piston chamber; the connecting shell is provided with a sliding chamber; the capsule shell assembly is slidably arranged in the sliding chamber; and when the capsule shell assembly slides inwards along the sliding chamber under the action of an external force, the piston assembly slides into the piston chamber to spray out the oral rinse in the piston chamber along the liquid outlet of the water flosser.

3. The water flosser according to claim 2, further comprising a moving member, wherein the moving member is movably arranged in the capsule shell assembly; the oral rinse accommodating chamber is formed between an inner wall of the moving member and an inner wall of the capsule shell assembly; and the moving member moves towards the piston assembly under the action of an atmospheric pressure and a hydraulic pressure difference in the oral rinse accommodating chamber.

4. The water flosser according to claim 2, further comprising a first elastic member, wherein a first end of the first elastic member abuts against the capsule shell assembly, and a second end of the first elastic member abuts against an inner wall of the sliding chamber.

5. The water flosser according to claim 2, wherein the connecting shell is provided with a connecting channel; a first end of the connecting channel is communicated to the piston chamber; and a second end of the connecting channel is communicated to the liquid outlet.

6. The water flosser according to claim 5, wherein the piston assembly includes a fixed rod and a piston rod; the fixed rod abuts against the shell and is inserted into the piston chamber; and the piston rod is slidably inserted into the piston chamber.

7. The water flosser according to claim 6, wherein the fixed rod is provided with a fixed rod channel; the piston rod is provided with a piston rod channel; and the piston rod is communicated to the piston chamber, the piston rod channel, the connecting channel, and the liquid outlet in sequence.

8. The water flosser according to claim 7, wherein the oral rinse capsule further includes a sealing member; the piston rod is further provided with a second through hole; the second through hole allows the piston chamber to be communicated to the piston rod channel; and the sealing member slidably sleeves the piston rod and closes or opens the second through hole.

9. The water flosser according to claim 2, wherein the oral rinse capsule further includes a first check valve; the capsule shell assembly is provided with a first communication hole; the first communication hole allows the oral rinse accommodating chamber to be communicated to the piston chamber; the first check valve is arranged in the first communication hole; and the first check valve is configured to allow the oral rinse to flow unidirectionally from the oral rinse accommodating chamber into the piston chamber.

10. The water flosser according to claim 2, wherein the capsule shell assembly is further provided with an air guide hole; an air pressure chamber is formed between the inner wall of the moving member and the inner wall of the capsule shell assembly; and the air guide hole is configured to communicate the air pressure chamber with an external atmosphere.

11. The water flosser according to claim 1, wherein a capsule accommodating chamber is provided at the bottom of the shell; and the oral rinse capsule is detachably inserted into the capsule accommodating chamber.

12. The water flosser according to claim 11, wherein a clamping slot is provided on a surface of the oral rinse capsule; a clamping assembly is arranged in the shell; a clamping end of the clamping assembly is threaded out of an inner wall of the capsule accommodating chamber of the shell and is detachably clamped in the clamping slot.

13. The water flosser according to claim 12, wherein the clamping assembly includes a clamping member, a push member, and a second elastic member; the shell is provided with a button hole; the push member is arranged in the button hole; a first end of the second elastic member abuts against the push member; a second end of the second elastic member abuts against the clamping member; the elasticity of the second elastic member drives the clamping member to be inserted into the clamping slot; and when pushed by an external force, the push member is configured to drive the clamping member to be removed from the clamping slot.

14. The water flosser according to claim 13, wherein the clamping assembly further includes a transmission member; a first end of the transmission member is rotatably connected to the push member; a middle part of the transmission member is rotatably connected to the shell; and a second end of the transmission member is rotatably connected to the clamping member.

15. The water flosser according to claim 12, wherein two clamping assemblies are comprised; and the two clamping assemblies are arranged in the shell and are respectively arranged on two sides of the capsule accommodating chamber.

16. The water flosser according to claim 11, further comprising a removal assembly, wherein the removal assembly includes a third elastic member and a removal convex block; an open pore is provided at an upper part of the inner wall of the capsule accommodating chamber; a first end of the third elastic member abuts against the shell; a second end of the third elastic member abuts against the removal convex block; an abutting end of the removal convex block is threaded out of the open pore and abuts against an upper surface of the oral rinse capsule.

17. The water flosser according to claim 16, wherein the third elastic member includes two springs; two spring accommodating slots are provided on the shell; the two springs are respectively inserted into the two spring accommodating slots; second ends of the two springs respectively abut against two ends of the removal convex block and are symmetrically arranged along an axis where the capsule accommodating chamber is located.

18. The water flosser according to claim 1, wherein the shell includes an upper shell and a bottom shell; the bottom shell is detachably connected to the upper shell; the water storage chamber is formed between the upper shell and the bottom shell; and the capsule accommodating chamber is arranged on the bottom shell.

19. The water flosser according to claim 18, further comprising a first sealing ring, wherein a first sealing groove is provided at an upper edge of the bottom shell; the first sealing ring is inserted into the first sealing groove; and an outer surface of the first sealing ring abuts against an inner wall of the upper shell.

20. The water flosser according to claim 18, further comprising a lock catch assembly, wherein the lock catch assembly includes a lock catch member and a fourth elastic member; a first end of the fourth elastic member abuts against the bottom shell; a second end of the fourth elastic member abuts against the lock catch member; and the lock catch member is locked on the upper shell.

* * * * *